US007949775B2

(12) United States Patent
Virdi et al.

(10) Patent No.: US 7,949,775 B2
(45) Date of Patent: May 24, 2011

(54) STREAM SELECTION FOR ENHANCED MEDIA STREAMING

(75) Inventors: Gurpratap Virdi, Bellevue, WA (US); Andres Vega-Garcia, Newcastle, WA (US); Serge Smirnov, Redmond, WA (US); Wenbo Zhang, Redmond, WA (US); Eldar Musayev, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/188,074

(22) Filed: Aug. 7, 2008

(65) Prior Publication Data

US 2009/0300203 A1 Dec. 3, 2009

Related U.S. Application Data

(60) Provisional application No. 61/057,755, filed on May 30, 2008, provisional application No. 61/057,759, filed on May 30, 2008.

(51) Int. Cl.
*G06F 15/16* (2006.01)
(52) U.S. Cl. .......................................... 709/231; 709/233
(58) Field of Classification Search .................. 709/224, 709/231, 232, 233
See application file for complete search history.

(56) References Cited

U.S. PATENT DOCUMENTS

| 4,051,470 A | 9/1977 | Esteban et al. |
| 4,454,546 A | 6/1984 | Mori |
| 4,493,091 A | 1/1985 | Gundry |
| 4,706,260 A | 11/1987 | Fedele et al. |
| 4,802,224 A | 1/1989 | Shiraki et al. |
| 4,849,812 A | 7/1989 | Borgers et al. |
| 4,937,036 A | 6/1990 | Beard et al. |
| 4,954,892 A | 9/1990 | Asai et al. |
| 5,043,919 A | 8/1991 | Callaway et al. |
| 5,089,889 A | 2/1992 | Sugiyama |
| 5,091,782 A | 2/1992 | Krause et al. |
| 5,136,377 A | 8/1992 | Johnston et al. |
| 5,223,949 A | 6/1993 | Honjo |
| 5,235,618 A | 8/1993 | Sakai et al. |
| 5,258,836 A | 11/1993 | Murata |
| 5,262,964 A | 11/1993 | Bonsall et al. |
| 5,266,941 A | 11/1993 | Akeley et al. |
| 5,317,672 A | 5/1994 | Crossman et al. |
| 5,335,299 A | 8/1994 | Atkinson |

(Continued)

FOREIGN PATENT DOCUMENTS

EP 0397402 11/1990

(Continued)

OTHER PUBLICATIONS

Agarwal et al., "Optimal Buffering Policy for Downloading Music in Heterogeneous Wireless Networks," Wireless Communications and Networking Conference, vol. 1, pp. 337-341, Mar. 17-21, 2002.

(Continued)

*Primary Examiner* — Krisna Lim
(74) *Attorney, Agent, or Firm* — Klarquist Sparkman, LLP

(57) ABSTRACT

The present disclosure relates to playback of video/audio streaming media data to provide a glitch-free experience. The system adapts the media stream to the user connection in order to provide the glitch-free experience. Stream selection can be made using a heuristics module located on the playback device that analyzes various aspects of the playback to make intelligent decisions about which media stream to download from a network.

17 Claims, 19 Drawing Sheets

U.S. PATENT DOCUMENTS

| | | |
|---|---|---|
| 5,394,170 A | 2/1995 | Akeley et al. |
| 5,398,069 A | 3/1995 | Huang et al. |
| 5,400,371 A | 3/1995 | Natarajan |
| 5,412,430 A | 5/1995 | Nagata |
| 5,414,796 A | 5/1995 | Jacobs et al. |
| RE34,965 E | 6/1995 | Sugiyama |
| 5,422,676 A | 6/1995 | Herpel et al. |
| 5,448,297 A | 9/1995 | Alattar et al. |
| 5,457,495 A | 10/1995 | Hartung |
| RE35,093 E | 11/1995 | Wang et al. |
| 5,467,086 A | 11/1995 | Jeong |
| 5,467,134 A | 11/1995 | Laney et al. |
| RE35,158 E | 2/1996 | Sugiyama |
| 5,533,052 A | 7/1996 | Bhaskar |
| 5,539,466 A | 7/1996 | Igarashi et al. |
| 5,570,363 A | 10/1996 | Holm |
| 5,579,430 A | 11/1996 | Grill et al. |
| 5,586,200 A | 12/1996 | Devaney et al. |
| 5,602,959 A | 2/1997 | Bergstrom et al. |
| 5,623,424 A | 4/1997 | Azadegan et al. |
| 5,650,860 A | 7/1997 | Uz |
| 5,654,760 A | 8/1997 | Ohtsuki |
| 5,661,755 A | 8/1997 | Van De Kerkhof et al. |
| 5,666,161 A | 9/1997 | Kohiyama et al. |
| 5,666,461 A | 9/1997 | Igarashi et al. |
| 5,678,002 A | 10/1997 | Fawcett et al. |
| 5,686,964 A | 11/1997 | Tabatabai et al. |
| 5,699,476 A | 12/1997 | Van Der Meer |
| 5,701,164 A | 12/1997 | Kato et al. |
| 5,724,453 A | 3/1998 | Ratnakar et al. |
| 5,742,735 A | 4/1998 | Eberlein et al. |
| 5,745,738 A | 4/1998 | Ricard |
| 5,754,974 A | 5/1998 | Griffin et al. |
| 5,764,807 A | 6/1998 | Pearlman |
| 5,764,814 A | 6/1998 | Chen et al. |
| 5,787,203 A | 7/1998 | Lee et al. |
| 5,796,438 A | 8/1998 | Hosono |
| RE35,910 E | 9/1998 | Nagata et al. |
| 5,802,213 A | 9/1998 | Gardos |
| 5,819,215 A | 10/1998 | Dobson et al. |
| 5,825,310 A | 10/1998 | Tsutsui |
| 5,835,149 A | 11/1998 | Astle |
| 5,835,495 A | 11/1998 | Ferriere |
| 5,845,243 A | 12/1998 | Smart et al. |
| 5,867,230 A | 2/1999 | Wang et al. |
| 5,874,995 A | 2/1999 | Naimpally et al. |
| 5,884,039 A | 3/1999 | Ludwig et al. |
| 5,886,276 A | 3/1999 | Levine et al. |
| 5,903,892 A | 5/1999 | Hoffert et al. |
| 5,926,226 A | 7/1999 | Proctor et al. |
| 5,933,451 A | 8/1999 | Ozkan et al. |
| 5,946,419 A | 8/1999 | Chen et al. |
| 5,949,489 A | 9/1999 | Nishikawa et al. |
| 5,952,943 A | 9/1999 | Walsh et al. |
| 5,963,258 A | 10/1999 | Nishikawa et al. |
| 5,970,173 A | 10/1999 | Lee et al. |
| 5,970,175 A | 10/1999 | Nishikawa et al. |
| 5,974,184 A | 10/1999 | Eifrig et al. |
| 5,982,305 A | 11/1999 | Taylor |
| 5,986,712 A | 11/1999 | Peterson et al. |
| 5,987,376 A | 11/1999 | Olson et al. |
| 5,990,945 A | 11/1999 | Sinha et al. |
| 5,990,960 A | 11/1999 | Murakami et al. |
| 5,995,151 A | 11/1999 | Naveen et al. |
| 6,000,053 A | 12/1999 | Levine et al. |
| 6,002,439 A | 12/1999 | Murakami et al. |
| 6,006,241 A | 12/1999 | Purnaveja et al. |
| RE36,507 E | 1/2000 | Iu |
| 6,014,706 A | 1/2000 | Cannon et al. |
| 6,029,126 A | 2/2000 | Malvar |
| 6,040,863 A | 3/2000 | Kato |
| 6,041,345 A | 3/2000 | Levi et al. |
| 6,049,630 A | 4/2000 | Wang et al. |
| 6,058,362 A | 5/2000 | Malvar |
| 6,072,831 A | 6/2000 | Chen |
| 6,073,153 A | 6/2000 | Malvar |
| 6,075,768 A | 6/2000 | Mishra |
| 6,081,554 A | 6/2000 | Lee et al. |
| 6,088,392 A | 7/2000 | Rosenberg |
| RE36,822 E | 8/2000 | Sugiyama |
| 6,097,759 A | 8/2000 | Murakami et al. |
| 6,108,382 A | 8/2000 | Gringeri et al. |
| 6,111,914 A | 8/2000 | Bist |
| 6,115,689 A | 9/2000 | Malvar |
| 6,141,053 A | 10/2000 | Saukkonen |
| 6,154,495 A | 11/2000 | Yamaguchi et al. |
| 6,160,846 A | 12/2000 | Chiang et al. |
| 6,167,162 A | 12/2000 | Jacquin et al. |
| 6,182,034 B1 | 1/2001 | Malvar |
| 6,188,794 B1 | 2/2001 | Nishikawa et al. |
| 6,192,075 B1 | 2/2001 | Jeng et al. |
| 6,208,761 B1 | 3/2001 | Passagio et al. |
| 6,212,232 B1 | 4/2001 | Reed et al. |
| 6,215,820 B1 | 4/2001 | Bagni et al. |
| 6,223,162 B1 | 4/2001 | Chen et al. |
| 6,226,407 B1 | 5/2001 | Zabih et al. |
| 6,240,380 B1 | 5/2001 | Malvar |
| RE37,222 E | 6/2001 | Yonemitsu et al. |
| 6,243,497 B1 | 6/2001 | Chiang et al. |
| 6,259,739 B1 | 7/2001 | Kondo |
| 6,259,810 B1 | 7/2001 | Gill et al. |
| 6,275,531 B1 | 8/2001 | Li |
| 6,278,735 B1 | 8/2001 | Mohsenian |
| 6,292,585 B1 | 9/2001 | Yamaguchi et al. |
| 6,304,928 B1 | 10/2001 | Mairs et al. |
| 6,307,973 B2 | 10/2001 | Nishikawa et al. |
| 6,311,209 B1 | 10/2001 | Olson et al. |
| 6,320,825 B1 | 11/2001 | Bruekers et al. |
| 6,324,216 B1 | 11/2001 | Igarashi et al. |
| 6,332,003 B1 | 12/2001 | Matsuura |
| 6,339,794 B2 | 1/2002 | Bolosky et al. |
| 6,351,226 B1 | 2/2002 | Saunders et al. |
| 6,370,502 B1 | 4/2002 | Wu et al. |
| 6,404,813 B1 | 6/2002 | Haskell et al. |
| 6,421,738 B1 | 7/2002 | Ratan et al. |
| 6,421,739 B1 | 7/2002 | Holiday |
| 6,441,754 B1 | 8/2002 | Wang et al. |
| 6,466,987 B2 | 10/2002 | Bolosky et al. |
| 6,473,409 B1 | 10/2002 | Malvar |
| 6,490,554 B2 | 12/2002 | Endo et al. |
| 6,493,388 B1 | 12/2002 | Wang |
| 6,496,601 B1 | 12/2002 | Migdal et al. |
| 6,501,798 B1 | 12/2002 | Sivan |
| 6,522,693 B1 | 2/2003 | Lu et al. |
| 6,539,124 B2 | 3/2003 | Sethuraman et al. |
| 6,560,636 B2 | 5/2003 | Cohen et al. |
| 6,573,905 B1 | 6/2003 | MacInnis et al. |
| 6,573,915 B1 | 6/2003 | Sivan et al. |
| 6,574,593 B1 | 6/2003 | Gao et al. |
| 6,614,442 B1 | 9/2003 | Ouyang et al. |
| 6,625,321 B1 | 9/2003 | Li et al. |
| 6,628,712 B1 | 9/2003 | Le Maguet |
| 6,646,195 B1 | 11/2003 | Puryear |
| 6,654,417 B1 | 11/2003 | Hui |
| 6,654,419 B1 | 11/2003 | Sriram et al. |
| 6,683,987 B1 | 1/2004 | Sugahara |
| 6,697,072 B2 | 2/2004 | Russell et al. |
| 6,704,813 B2 | 3/2004 | Smirnov et al. |
| 6,728,317 B1 | 4/2004 | Demos |
| 6,732,071 B2 | 5/2004 | Lopez-Estrada et al. |
| 6,745,364 B2 | 6/2004 | Bhatt et al. |
| 6,754,715 B1 | 6/2004 | Cannon et al. |
| 6,760,598 B1 | 7/2004 | Kurjenniemi |
| 6,763,374 B1 | 7/2004 | Levi et al. |
| 6,785,331 B1 | 8/2004 | Jozawa et al. |
| 6,789,123 B2 | 9/2004 | Li et al. |
| 6,792,449 B2 | 9/2004 | Colville et al. |
| 6,798,364 B2 | 9/2004 | Chen et al. |
| 6,810,083 B2 | 10/2004 | Chen et al. |
| 6,819,714 B2 | 11/2004 | Yamada et al. |
| 6,836,791 B1 | 12/2004 | Levi et al. |
| 6,862,402 B2 | 3/2005 | Kim |
| 6,876,703 B2 | 4/2005 | Ismaeil et al. |
| 6,895,050 B2 | 5/2005 | Lee |
| 6,934,677 B2 | 8/2005 | Chen et al. |
| 6,937,770 B1 | 8/2005 | Oguz et al. |
| 6,961,631 B1 | 11/2005 | Puryear |

| | | | |
|---|---|---|---|
| 6,968,364 B1 | 11/2005 | Wong et al. | |
| 6,974,901 B2 | 12/2005 | Puryear | |
| 6,980,695 B2 | 12/2005 | Mehrotra | |
| 7,016,409 B2 | 3/2006 | Unger | |
| 7,023,915 B2 | 4/2006 | Pian | |
| 7,027,982 B2 | 4/2006 | Chen et al. | |
| 7,046,805 B2 | 5/2006 | Fitzhardinge et al. | |
| 7,054,365 B2 | 5/2006 | Kim et al. | |
| 7,054,774 B2 | 5/2006 | Batterberry et al. | |
| 7,072,973 B1 | 7/2006 | Newson et al. | |
| 7,107,606 B2 | 9/2006 | Lee | |
| 7,143,030 B2 | 11/2006 | Chen et al. | |
| 7,146,313 B2 | 12/2006 | Chen et al. | |
| 7,149,247 B2 | 12/2006 | Sullivan | |
| 7,151,749 B2 | 12/2006 | Vega-Garcia et al. | |
| 7,162,533 B2 | 1/2007 | Klemets | |
| 7,174,384 B2 | 2/2007 | Cheung | |
| 7,174,385 B2 | 2/2007 | Li | |
| 7,176,957 B2 | 2/2007 | Ivashin et al. | |
| 7,184,959 B2 | 2/2007 | Gibbon | |
| 7,190,670 B2 | 3/2007 | Varsa et al. | |
| 7,206,822 B2 | 4/2007 | Levi et al. | |
| 7,206,854 B2 | 4/2007 | Kauffman et al. | |
| 7,248,740 B2 | 7/2007 | Sullivan | |
| 7,260,525 B2 | 8/2007 | Chen et al. | |
| 7,263,482 B2 | 8/2007 | Chen et al. | |
| 7,266,613 B1 | 9/2007 | Brown et al. | |
| 7,283,881 B2 | 10/2007 | Puryear | |
| 7,283,966 B2 | 10/2007 | Zhang et al. | |
| 7,286,748 B2 | 10/2007 | Srinivasan et al. | |
| 7,296,063 B2 | 11/2007 | Levi et al. | |
| 7,302,490 B1 | 11/2007 | Gupta et al. | |
| 7,313,236 B2 | 12/2007 | Amini et al. | |
| 7,313,755 B2 | 12/2007 | Rahman et al. | |
| 7,342,924 B2 | 3/2008 | Levi et al. | |
| 7,343,291 B2 | 3/2008 | Thumpudi et al. | |
| 7,346,007 B2 | 3/2008 | Curcio et al. | |
| 7,348,483 B2 | 3/2008 | Puryear | |
| 7,359,955 B2 | 4/2008 | Menon et al. | |
| 7,360,230 B1 | 4/2008 | Paz et al. | |
| 7,365,752 B2 | 4/2008 | Xie | |
| 7,383,180 B2 | 6/2008 | Thumpudi et al. | |
| 7,391,717 B2 * | 6/2008 | Klemets et al. | 370/216 |
| 7,392,316 B2 | 6/2008 | Klemets et al. | |
| 7,401,221 B2 | 7/2008 | Adent et al. | |
| 7,409,145 B2 * | 8/2008 | Antoun et al. | 386/125 |
| 7,424,730 B2 | 9/2008 | Chou | |
| 7,433,746 B2 | 10/2008 | Puryear | |
| 7,444,419 B2 * | 10/2008 | Green | 709/231 |
| 7,451,229 B2 | 11/2008 | Klemets et al. | |
| 7,466,721 B2 | 12/2008 | Levi et al. | |
| 7,472,198 B2 | 12/2008 | Gupta et al. | |
| 7,480,382 B2 | 1/2009 | Dunbar et al. | |
| 7,483,532 B2 | 1/2009 | Alkove et al. | |
| 7,492,769 B2 | 2/2009 | Klemets | |
| 7,493,644 B1 * | 2/2009 | Tanskanen | 725/62 |
| 7,505,485 B2 | 3/2009 | Sullivan et al. | |
| 7,528,314 B2 | 5/2009 | Puryear | |
| 7,536,469 B2 * | 5/2009 | Chou et al. | 709/231 |
| 7,538,267 B2 | 5/2009 | Puryear | |
| 7,552,227 B2 | 6/2009 | Wang | |
| 7,554,922 B2 | 6/2009 | Vega-Garcia et al. | |
| 7,558,472 B2 | 7/2009 | Locket et al. | |
| 7,565,429 B1 * | 7/2009 | Fernandez | 709/224 |
| 7,581,255 B2 | 8/2009 | Alkove et al. | |
| 7,603,387 B2 | 10/2009 | Gates et al. | |
| 7,631,015 B2 | 12/2009 | Gupta et al. | |
| 7,633,005 B2 | 12/2009 | Puryear | |
| 7,644,172 B2 | 1/2010 | Stewart et al. | |
| 7,663,049 B2 | 2/2010 | Puryear | |
| 7,667,121 B2 | 2/2010 | Puryear | |
| 7,672,743 B2 | 3/2010 | Messer et al. | |
| 7,673,306 B2 | 3/2010 | Puryear | |
| 7,673,315 B1 | 3/2010 | Wong et al. | |
| 7,676,495 B2 | 3/2010 | Qian | |
| 7,684,566 B2 | 3/2010 | Oliveira et al. | |
| 7,720,908 B1 | 5/2010 | Newson et al. | |
| 7,725,557 B2 | 5/2010 | Klemets et al. | |
| 7,761,609 B1 | 7/2010 | Srinivasan et al. | |
| 7,769,880 B2 | 8/2010 | Paka et al. | |
| 7,783,772 B2 | 8/2010 | Klemets | |
| 7,783,773 B2 * | 8/2010 | Wu et al. | 709/231 |
| 7,809,851 B2 | 10/2010 | Klemets | |
| 7,839,895 B2 | 11/2010 | Sullivan et al. | |
| 7,860,996 B2 * | 12/2010 | Musayev et al. | 709/231 |
| 2002/0012394 A1 | 1/2002 | Hatano et al. | |
| 2002/0073084 A1 | 6/2002 | Kauffman et al. | |
| 2002/0095332 A1 | 7/2002 | Doherty et al. | |
| 2002/0114388 A1 | 8/2002 | Ueda | |
| 2002/0122491 A1 | 9/2002 | Karcewicz et al. | |
| 2002/0136406 A1 | 9/2002 | Fitzhardinge et al. | |
| 2002/0143556 A1 | 10/2002 | Kadatch | |
| 2002/0154693 A1 | 10/2002 | Demos | |
| 2002/0168066 A1 | 11/2002 | Li | |
| 2002/0176624 A1 | 11/2002 | Kostrzewski et al. | |
| 2002/0194608 A1 | 12/2002 | Goldhor | |
| 2003/0055995 A1 | 3/2003 | Ala-Honkola | |
| 2003/0061607 A1 | 3/2003 | Hunter et al. | |
| 2003/0093530 A1 | 5/2003 | Syed | |
| 2003/0110236 A1 | 6/2003 | Yang et al. | |
| 2003/0113026 A1 | 6/2003 | Srinivasan et al. | |
| 2003/0115041 A1 | 6/2003 | Chen | |
| 2003/0115042 A1 | 6/2003 | Chen | |
| 2003/0115050 A1 | 6/2003 | Chen | |
| 2003/0115051 A1 | 6/2003 | Chen | |
| 2003/0115052 A1 | 6/2003 | Chen | |
| 2003/0125932 A1 | 7/2003 | Wang et al. | |
| 2003/0172131 A1 | 9/2003 | Ao | |
| 2003/0236905 A1 | 12/2003 | Choi et al. | |
| 2003/0236906 A1 * | 12/2003 | Klemets et al. | 709/231 |
| 2004/0042549 A1 | 3/2004 | Huang et al. | |
| 2004/0098748 A1 | 5/2004 | Bo et al. | |
| 2004/0117427 A1 | 6/2004 | Allen et al. | |
| 2004/0131340 A1 * | 7/2004 | Antoun et al. | 386/125 |
| 2004/0136457 A1 | 7/2004 | Funnell et al. | |
| 2004/0141651 A1 | 7/2004 | Hara et al. | |
| 2004/0172478 A1 | 9/2004 | Jacobs | |
| 2004/0268397 A1 | 12/2004 | Dunbar et al. | |
| 2005/0002453 A1 | 1/2005 | Chang et al. | |
| 2005/0015259 A1 | 1/2005 | Thumpudi et al. | |
| 2005/0015528 A1 | 1/2005 | Du | |
| 2005/0016363 A1 | 1/2005 | Puryear | |
| 2005/0024487 A1 | 2/2005 | Chen | |
| 2005/0036759 A1 | 2/2005 | Lin et al. | |
| 2005/0047503 A1 | 3/2005 | Han et al. | |
| 2005/0066063 A1 * | 3/2005 | Grigorovitch et al. | 710/1 |
| 2005/0076039 A1 | 4/2005 | Ludwig et al. | |
| 2005/0076136 A1 | 4/2005 | Cho | |
| 2005/0084015 A1 | 4/2005 | Han et al. | |
| 2005/0084166 A1 | 4/2005 | Boneh et al. | |
| 2005/0105815 A1 | 5/2005 | Zhang et al. | |
| 2005/0117641 A1 | 6/2005 | Xu et al. | |
| 2005/0123058 A1 | 6/2005 | Greenbaum | |
| 2005/0135484 A1 | 6/2005 | Lee | |
| 2005/0157784 A1 | 7/2005 | Tanizawa et al. | |
| 2005/0204385 A1 | 9/2005 | Sull et al. | |
| 2005/0207734 A1 | 9/2005 | Howell | |
| 2005/0234731 A1 | 10/2005 | Sirivara et al. | |
| 2005/0234858 A1 | 10/2005 | Torii et al. | |
| 2005/0246384 A1 | 11/2005 | Foehr et al. | |
| 2005/0254508 A1 | 11/2005 | Aksu et al. | |
| 2005/0254584 A1 | 11/2005 | Kim et al. | |
| 2005/0267994 A1 | 12/2005 | Wong et al. | |
| 2006/0015637 A1 | 1/2006 | Chung | |
| 2006/0026294 A1 * | 2/2006 | Virdi et al. | 709/232 |
| 2006/0029192 A1 | 2/2006 | Fellman | |
| 2006/0062302 A1 | 3/2006 | Yin et al. | |
| 2006/0088094 A1 | 4/2006 | Cieplinski et al. | |
| 2006/0126713 A1 | 6/2006 | Chou et al. | |
| 2006/0136597 A1 | 6/2006 | Shabtai et al. | |
| 2006/0156363 A1 | 7/2006 | Wu et al. | |
| 2006/0165166 A1 * | 7/2006 | Chou et al. | 375/240.05 |
| 2006/0184697 A1 | 8/2006 | Virdi | |
| 2006/0218264 A1 | 9/2006 | Ogawa et al. | |
| 2006/0235883 A1 | 10/2006 | Krebs et al. | |
| 2006/0242080 A1 | 10/2006 | Van Dyke et al. | |
| 2006/0242315 A1 | 10/2006 | Nichols | |
| 2006/0248570 A1 | 11/2006 | Witwer | |

| | | | |
|---|---|---|---|
| 2006/0282566 | A1 | 12/2006 | Virdi et al. |
| 2007/0006064 | A1 | 1/2007 | Colle |
| 2007/0038873 | A1 | 2/2007 | Oliveira et al. |
| 2007/0058926 | A1 | 3/2007 | Virdi |
| 2007/0078768 | A1 | 4/2007 | Dawson |
| 2007/0083886 | A1 | 4/2007 | Kauffman et al. |
| 2007/0097816 | A1* | 5/2007 | Van Gassel ............... 369/47.33 |
| 2007/0100891 | A1 | 5/2007 | Nee |
| 2007/0192789 | A1 | 8/2007 | Medford |
| 2007/0204321 | A1 | 8/2007 | Shen et al. |
| 2007/0274383 | A1 | 11/2007 | Yu et al. |
| 2007/0276954 | A1 | 11/2007 | Chan et al. |
| 2008/0022005 | A1* | 1/2008 | Wu et al. ...................... 709/231 |
| 2008/0037954 | A1 | 2/2008 | Lee |
| 2008/0046939 | A1 | 2/2008 | Lu et al. |
| 2008/0060029 | A1 | 3/2008 | Park et al. |
| 2008/0086570 | A1 | 4/2008 | Dey et al. |
| 2008/0091838 | A1 | 4/2008 | Miceli |
| 2008/0172441 | A1 | 7/2008 | Speicher |
| 2008/0195744 | A1 | 8/2008 | Bowra |
| 2008/0195761 | A1 | 8/2008 | Jabri et al. |
| 2008/0201386 | A1 | 8/2008 | Maharajh et al. |
| 2008/0211901 | A1 | 9/2008 | Civanlar et al. |
| 2008/0256085 | A1 | 10/2008 | Lee et al. |
| 2008/0312923 | A1 | 12/2008 | Crinon et al. |
| 2009/0007171 | A1 | 1/2009 | Casey et al. |
| 2009/0043657 | A1 | 2/2009 | Swift et al. |
| 2009/0043906 | A1 | 2/2009 | Hurst et al. |
| 2009/0049186 | A1 | 2/2009 | Agnihotri et al. |
| 2009/0055417 | A1 | 2/2009 | Hannuksela |
| 2009/0076904 | A1 | 3/2009 | Serena |
| 2009/0089401 | A1 | 4/2009 | Zhang et al. |
| 2009/0132356 | A1 | 5/2009 | Booth et al. |
| 2009/0132599 | A1 | 5/2009 | Soroushian et al. |
| 2009/0132721 | A1 | 5/2009 | Soroushian et al. |
| 2009/0199236 | A1 | 8/2009 | Barrett et al. |
| 2009/0254672 | A1 | 10/2009 | Zhang |
| 2009/0279605 | A1 | 11/2009 | Holcomb et al. |
| 2009/0282162 | A1 | 11/2009 | Mehrotra et al. |
| 2009/0282475 | A1 | 11/2009 | George et al. |
| 2009/0297123 | A1 | 12/2009 | Virdi et al. |
| 2009/0300145 | A1 | 12/2009 | Musayev et al. |
| 2009/0300204 | A1 | 12/2009 | Zhang et al. |
| 2009/0319681 | A1 | 12/2009 | Freelander et al. |
| 2009/0328124 | A1 | 12/2009 | Khouzam et al. |
| 2010/0011119 | A1 | 1/2010 | Knowlton et al. |
| 2010/0058061 | A1 | 3/2010 | Folta et al. |
| 2010/0080290 | A1 | 4/2010 | Mehrotra |
| 2010/0114921 | A1 | 5/2010 | Bocharov et al. |
| 2010/0135636 | A1 | 6/2010 | Zhang et al. |
| 2010/0153988 | A1 | 6/2010 | Takai et al. |
| 2010/0158101 | A1 | 6/2010 | Wu et al. |
| 2010/0180011 | A1 | 7/2010 | Sood et al. |
| 2010/0189183 | A1 | 7/2010 | Gu et al. |
| 2010/0191974 | A1 | 7/2010 | Dubhashi et al. |
| 2010/0235472 | A1 | 9/2010 | Sood et al. |
| 2010/0235528 | A1 | 9/2010 | Bocharov et al. |

FOREIGN PATENT DOCUMENTS

| | | |
|---|---|---|
| EP | 0526163 | 2/1993 |
| JP | 62 213 494 | 9/1987 |
| JP | 6 078 298 | 3/1994 |
| JP | 10 056 644 | 2/1998 |
| JP | 2008-523687 | 7/2008 |
| WO | WO 00/36753 | 6/2000 |
| WO | WO 2007/058515 | 5/2007 |

OTHER PUBLICATIONS

Chavez et al., "Monitoring-Based Adaptive Overlay Streaming Media," printed from http://www.eecs.berkeley.edu/Programs/ugrad/superb/papers2003/Brian%20Chavez.pdf on Aug. 12, 2008.

Huang et al., "Adaptive Live Video Streaming by Priority Drop," Proceedings of the IEEE Conference on Advanced Video and Signal Based Surveillance, pp. 342-347, Jul. 21-22, 2003.

Qazzaz et al., "Providing Interactive Video on Demand Services in Distributed Architecture," 29th Proceedings of the Euromicro Conference, pp. 215-222, Sep. 1-6, 2003.

Reibman et al., "Video Quality Estimation for Internet Streaming," International World Wide Web Conference, pp. 1168-1169, 2005.

Srinivasan et al., "Windows Media Video 9: Overview and Applications," Signal Processing: Image Communication, vol. 19, pp. 851-875, Oct. 2004.

Zhang et al., "Seamless Bit-Stream Switching in Multirate-Based Video Streaming Systems," EURASIP Journal on Applied Signal Processing, vol. 2006, No. 18, p. 1-11, 2006.

Chang et al., "BubbleUp: Low Latency Fast-Scan for Media Servers," Fifth ACM International Conference on Multimedia 1997, Nov. 1997, 12 pages.

Guo et al., "P2Cast: Peer-to-peer Patching Scheme for VoD Service," Proceedings of the 12th International Conference on World Wide Web, 2003, 9 pages.

Microsoft TechNet, "Streaming Media Services Role," Jan. 2008, 3 pages.

Zheng et al., "Multimedia Over High Speed Networks: Reducing Network Requirements with Fast Buffer Fillup," IEEE GLOBECOM-98, Nov. 1998, 6 pages.

U.S. Appl. No. 60/341,674, filed Dec. 17, 2001, Lee et al.

Advanced Television Systems Committee, "ATSC Standard: Digital Audio Compression (AC-3), Revision A," pp. 1-140 (Aug. 2001).

Aksoy, "Wireless Thin Client Optimization for Multimedia Applications," M.S. Thesis, 166 pp. (2000).

Barker et al., "Dynamic Programming Based Smoothing of VBR Video Traffic," 10 pp. (document marked Mar. 6, 2002).

Baron et al, "Coding the Audio Signal," *Digital Image and Audio Communications*, pp. 101-128 (1998).

Beerends, "Audio Quality Determination Based on Perceptual Measurement Techniques," *Applications of Digital Signal Processing to Audio and Acoustics*, Chapter 1, Ed. Mark Kahrs, Karlheinz Brandenburg, Kluwer Acad. Publ., pp. 1-38 (1998).

Caetano et al., "Rate Control Strategy for Embedded Wavelet Video Coders," *Electronic Letters*, pp. 1815-1817 (Oct. 14, 1999).

Cheung et al., "A Comparison of Scalar Quantization Strategies for Noisy Data Channel Data Transmission," *IEEE Transactions on Communications*, vol. 43, No. 2/3/4, pp. 738-742 (Apr. 1995).

Crisafulli et al., "Adaptive Quantization: Solution via Nonadaptive Linear Control," *IEEE Transactions on Communications*, vol. 41, pp. 741-748 (May 1993).

Dai, "Rate-Distortion Analysis and Traffic Modeling of Scalable Video Coders," Dissertation, Texas A&M University, 172 pp. (Dec. 2004).

Dalgic et al., "Characterization of Quality and Traffic for Various Video Encoding Schemes and Various Encoder Control Schemes," Technical Report No. CSL-TR-96-701 (Aug. 1996).

De Luca, "AN1090 Application Note: STA013 MPEG 2.5 Layer III Source Decoder," *STMicroelectronics*, 17 pp. (1999).

de Queiroz et al., "Time-Varying Lapped Transforms and Wavelet Packets," *IEEE Transactions on Signal Processing*, vol. 41, pp. 3293-3305 (1993).

"DivX Multi Standard Video Encoder," 2 pp. (Downloaded from the World Wide Web on Jan. 24, 2006).

Doering, "Low-Cost, High-Impact Video Production Techniques for Laboratory Instructional Materials," *ASEE/IEEE Frontiers in Education Conference*, Session F1C, pp. 14-18 (Oct. 2001.).

Dolby Laboratories, "AAC Technology," 4 pp. [Downloaded from the web site aac-audio.com on World Wide Web on Nov. 21, 2001].

Fraunhofer-Gesellschaft, "MPEG Audio Layer-3," 4 pp. [Downloaded from the World Wide Web on Oct. 24, 2001].

Fraunhofer-Gesellschaft, "MPEG-2 AAC," 3 pp. [Downloaded from the World Wide Web on Oct. 24, 2001].

Gibson et al, *Digital Compression for Multimedia*, Chapter 4, "Quantization," pp. 113-118 (1998).

Gibson et al., *Digital Compression for Multimedia*, Chapter 7, "Frequency Domain Coding," Morgan Kaufman Publishers, Inc., pp. iii., v-xi, and 227-262 (1998).

Gibson et al., *Digital Compression for Multimedia*, Chapter 8, "Frequency Domain Speech and Audio Coding Standards," Morgan Kaufman Publishers, Inc., pp. 263-290 (1998).

Gibson et al., *Digital Compression for Multimedia*, Chapter 11.4, "MPEG Audio," Morgan Kaufman Publishers, Inc., pp. 398-402 (1998).

Gibson et al., *Digital Compression for Multimedia*, Chapter 11.6.2-11.6.4, "More MPEG," Morgan Kaufman Publishers, Inc., pp. 415-416 (1998).

Gill et al., "Creating High-Quality Content with Microsoft Windows Media Encoder 7," 4 pp. (2000). [Downloaded from the World Wide Web on May 1, 2002.].

Girod et al., "Advances in channel-adaptive video streaming," *Wireless Communications and Mobile Computing*, 24 pp. (Sep. 2002).

Guo et al., "P2Cast: Peer-to-peer Patching Scheme for VoD Service," Proceedings of the 12th International Conference on World Wide Web, 2003, 9 pages.

Herley et al., "Tilings of the Time-Frequency Plane: Construction of Arbitrary Orthogonal Bases and Fast Tiling Algorithms," *IEEE Transactions on Signal Processing*, vol. 41, No. 12, pp. 3341-3359 (1993).

He et al., "A Unified Rate-Distortion Analysis Framework for Transform Coding," *IEEE Transactions on Circuits and Systems for Video Technology*, vol. 11, No. 12, pp. 1221-1236 (Dec. 2001).

Hsu et al., "Joint Selection of Source and Channel Rate for VBR Video Transmission Under ATM Policing Constraints," *IEEE Journal on Selected Areas in Communications*, vol. 15, No. 6, pp. 1016-1028 (Aug. 1997).

Huang et al., "Optimal Coding Rate Control of Scalable and Multi Bit Rate Streaming Media," Microsoft Research Technical Report, MSR-TR-2005-47, 26 pp. (Apr. 2005).

Huang et al., "Optimal Control of Multiple Bit Rates for Streaming Media," *Proc. Picture Coding Symposium*, 4 pp. (Dec. 2004).

International Search Report and Written Opinion dated Mar. 22, 2010, from Application No. PCT/US2009/054081, 9 pp.

ISO, "MPEG-4 Video Verification Model version 18.0," ISO/IEC JTC1/SC29/WG11 N3908, Pisa, pp. 1-10, 299-311 (Jan. 2001).

ISO/IEC, "Information Technology—Coding of Audio-Visual Objects: Visual, ISO/IEC 14496-2, Committee Draft," 330 pp. (1998).

ISO/IEC, "ISO/IEC 11172-2: Information Technology—Coding of Moving Pictures and Associatged Audio for Storage Medua at up to About 1.5 Mbit/s," 122 pp. (1993).

ISO/IEC 11172-3, Information Technology—Coding of Moving Pictures and Associated Audio for Digital Storage Media at Up to About 1.5 Mbit/s—Part 3 Audio, 154 pp, (1993).

ISO/IEC 13818-7, "Information Technology—Generic Coding of Moving Pictures and Associated Audio Information," Part 7: Advanced Audio Coding (AAC), pp. i-iv, 1-145 (1997).

ISO/IEC 13818-7, Technical Corrigendum 1, "Information Technology—Generic Coding of Moving Pictures and Associated Audio Information," Part 7: Advanced Audio Coding (AAC), Technical Corrigendum, pp. 1-22 (1997).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

ITU, Recommendation ITU-R BS 1115, Low Bit-Rate Audio Coding, 9 pp. (1994).

ITU, Recommendation ITU-R BS 1387, Method for Objective Measurements of Perceived Audio Quality, 89 pp. (1998).

Jafarkhani et al., "Entropy-Constrained Successively Refinable Scalar Quantization," *IEEE Data Compression Conference*, pp. 337-346 (Mar. 1997).

Jayant et al., *Digital Coding of Waveforms, Principles and Applications to Speech and Video*, Prentice Hall, pp. 428-445 (Mar. 1984).

Jenkac et al., "On Video Streaming over Variable Bit-rate and Wireless Channels," presented at PacketVideo 2003, Nantes, France, Apr. 28-29, 2003, 11 pp.

Jesteadt et al., "Forward Masking as a Function of Frequency, Masker Level, and Signal Delay," *Journal of Acoustical Society of America*, vol. 71, pp. 950-962 (1982).

Johansen, "Rate-Distortion Optimization for Video Communication in Resource Constrained IP Networks," Thesis, Norwegian University of Science and Technology, 161 pp. (Dec. 2007).

Joint Video Team of ISO/IEC MPEG and ITU-T VCEG, "Committee Draft of Joint Video Specification (ITU-T Recommendation H.264, ISO/IEC 14496-10 AVC," 142 pp. (Aug. 2002).

Kalman et al., "Rate-Distortion Optimized Video Streaming with Adaptive Playout," Proc. Int'l Conf. on Image Processing, 4 pp (Jun. 2002).

Kammin et al., "Video multiplexing for the MPEG-2 VBR encoder using a deterministic method," *Second Int'l Conf. on Automated Production of Cross Media Content for Multi-Channel Distribution*, 8 pp. (Dec. 2006).

Kondoz, *Digital Speech: Coding for Low Bit Rate Communications Systems*, "Chapter 3.3: Linear Predictive Modeling of Speech Signals," and "Chapter 4: LPC Parameter Quantization Using LSFs," John Wiley & Sons, pp. 42-53 and 79-97 (1994).

Li et al., "Optimal Linear Interpolation Coding for Server-Based Computing," *Proc. IEEE Int'l Conf. on Communications*, 5 pp. (Apr. 2002).

Lutfi, "Additivity of Simultaneous Masking," *Journal of Acoustic Society of America*, vol. 73, pp. 262-267 (1983).

Malvar, "Biorthogonal and Nonuniform Lapped Transforms for Transform Coding with Reduced Blocking and Ringing Artifacts," *IEEE Transactions on Signal Processing, Special Issue on Multirate Systems, Filter Banks, Wavelets, and Applications*, vol. 46, 29 pp. (1998).

Malvar, "Lapped Transforms for Efficient Transform/Subband Coding," *IEEE Transactions on Acoustics, Speech and Signal Processing*, vol. 38, No. 6, pp. 969-978 (1990).

Malvar, *Signal Processing with Lapped Transforms*, Artech House, Norwood, MA, pp. iv, vii-xi, 175-218, and 353-357 (1992).

Matthias, "An Overview of Microsoft Windows Media Screen Technology," 3 pp. (2000). [Downloaded from the World Wide Web on May 1, 2002.].

Mook, "Next-Gen Windows Media Player Leaks to the Web," *BetaNews*, 17 pp. (Jul. 19, 2002) [Downloaded from the World Wide Web on Aug. 8, 2003].

Naveen et al., "Subband Finite State Scalar Quantization," *IEEE Transactions on Image Processing*, vol. 5, No. 1, pp. 150-155 (Jan. 1996).

OPTICOM GmbH, "Objective Perceptual Measurement," 14 pp. [Downloaded from the World Wide Web on Oct. 24, 2001].

OPTX International, "OPTX Improves Technology-Based Training with ScreenWatch™ 3.0. Versatile Screen Capture Software Adds High Color and Live Webcast Support," 1 p., document marked Feb. 15, 2001 [Downloaded from the World Wide Web on Sep. 22, 2005.].

OPTX International, "OPTX International Marks One Year Anniversary of Screen Watch With Release of New 2.0 Version," 1 p. document marked May 16, 2000 [Downloaded from the World Wide Web on Sep. 22, 2005.].

OPTX International, "New ScreenWatch™ 4.0 Click and Stream™ Wizard From OPTX International Makes Workplace Communication Effortless," 1 p., document marked Sep. 24, 2001 [Downloaded from the World Wide Web on Sep. 22, 2005.].

Ortega et al., "Adaptive Scalar Quantization Without Side Information," *IEEE Transactions on Image Processing*, vol. 6, No. 5, pp. 665-676 (May 1997).

Ortega, "Optimal bit allocation under multiple rate constraints," *Proc. of the Data Compression Conf.*, 10 pp. (Apr. 1996).

Ortega et al., "Optimal Buffer-Constrained Source Quantization and Fast Approximations," *IEEE*, pp. 192-195 (May 1992).

Ortega et al., "Optimal Trellis-based Buffered Compression and Fast Approximation," *IEEE Transactions on Image Processing*, vol. 3, No. 1, pp. 26-40 (Jan. 1994).

Palmer et al., "Shared Desktop: A Collaborative Tool for Sharing 3-D Applications Among Different Window Systems," *Digital Tech. Journal*, vol. 9, No. 3, pp. 42-49 (1997).

Pao, "Encoding Stored Video for Streaming Applications," *IEEE Transactions on Circuits and Systems for Video Technology*, vol. 11, No. 2, pp. 199-209 (Feb. 2001).

Phamdo, "Speech Compression," 13 pp. [Downloaded from the World Wide Web on Nov. 25, 2001].

Printouts of FTP directories from http://ftp3.itu.ch, 8 pp. (downloaded from the World Wide Web on Sep. 20, 2005).

Ramchandran et al., "Bit Allocation for Dependent Quantization with Applications to MPEG Video Coders," *IEEE*, pp. v-381-v-384 (Apr. 1993).

Ratnakar et al., "RD-OPT: An Efficient Algorithm for Optimizing DCT Quantization Tables," *IEEE*, pp. 332-341 (Mar. 1995).

Reader, "History of MPEG Video Compression—Ver. 4.0," 99 pp. (document marked Dec. 16, 2003).

Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).

Reibman et al., "Constraints on Variable Bit-rate Video for ATM Networks," *IEEE Transactions on Circuits and Systems for Video Technology*, No. 4, pp. 361-372 (Dec. 1992).

Rexford et al., "Online Smoothing of Live, Variable-Bit-Rate Video," *IEEE*, pp. 235-243 (May 1997).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Ronda et al., "Rate Control and Bit Allocation for MPEG-4," *IEEE Transactions on Circuits and Systems for Video Technology*, pp. 1243-1258 (Dec. 1999).

Schaar-Mitrea et al., "Hybrid Compression of Video with Graphics in DTV Communications Systems," *IEEE Trans. On Consumer Electronics*, pp. 1007-1017 (2000).

Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).

Schulzrinne, "Operating System Issues for Continuous Media," *ACM Multimedia Systems*, vol. 4, No. 5, 13 pp. (Mar. 1996).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Sheu et al., "A Buffer Allocation Mechanism for VBR Video Playback," Communication Tech. Proc. 2000, WCC-ICCT 2000, vol. 2, pp. 1641-1644 (Aug. 2000).

Sidiropoulos, "Optimal Adaptive Scalar Quantization and Image Compression," *ICIP*, pp. 574-578 (Oct. 1998).

Sjoberg et al., "Run-length Coding of Skipped Macroblocks," ITU-T SG16/Q.6 VCEG-M57, pp. 1-5 (Apr. 2001).

Solari, *Digital Video and Audio Compression*, Title Page, Contents, "Chapter 8: Sound and Audio," McGraw-Hill, Inc., pp. iii, v-vi, and 187-211 (1997).

Srinivasan et al., "High-Quality Audio Compression Using an Adaptive Wavelet Packet Decomposition and Psychoacoustic Modeling," *IEEE Transactions on Signal Processing*, vol. 46, No. 4, pp. 1085-1093 (Apr. 1998).

Sullivan, "Optimal Entropy Constrained Scalar Quantization for Exponential and Laplacian Random Variables," *ICASSP*, pp. V-265-V-268 (Apr. 1994).

Sullivan et al., "Rate-Distortion Optimization for Video Compression,"*IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Sun et al., "Seamless Switching of Scalable Video Bitstreams for Efficient Streaming," *IEEE Transactions on Multimedia*, vol. 6, No. 2, pp. 291-303 (Apr. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Techsmith Corporation, "Camtasia Feature of the Week: Quick Capture," 2 pp. [Downloaded from the World Wide Web on May 9, 2002; document dated Jan. 4, 2001].

Techsmith Corporation, "Camtasia Screen Recorder SDK DLL API User Guide," Version 1.0, 66 pp. (2001).

Techsmith Corporation, "Camtasia v.3.0.1—README.TXT," 19 pp. (Jan. 2002).

Techsmith Corporation, "Techsmith Camtasia Screen Recorder SDK," 2 pp. (2001).

Terhardt, "Calculating Virtual Pitch," *Hearing Research*, vol. 1, pp. 155-182 (1979).

Trushkin, "On the Design on an Optimal Quantizer," *IEEE Transactions on Information Theory*, vol. 39, No. 4, pp. 1180-1194 (Jul. 1993).

Tsang et al., "Fuzzy based rate control for real-time MPEG video," 12 pp. (Nov. 1998).

Vetro et al., "An Overview of MPEG-4 Object-Based Encoding Algorithms," *IEEE International Symposium on Information Technology*, pp. 366-369 (2001).

Vicars-Harris, "An Overview of Advanced Systems Format," 3 pp. (May 2003) [Downloaded from the World Wide Web on Mar. 16, 2004].

Walpole et al., "A Player for Adaptive MPEG Video Streaming over the Internet," *Proc. SPIE*, vol. 3240, pp. 270-281 (Mar. 1998).

Westerink et al., "Two-pass MPEG-2 Variable-bit-rate Encoding," *IBM J. Res. Develop.*, vol. 43, No. 4, pp. 471-488 (Jul. 1999).

Wong, "Progressively Adaptive Scalar Quantization," *ICIP*, pp. 357-360 (Sep. 1996).

Wragg et al., "An Optimised Software Solution for an ARM Powered™ MP3 Decoder," 9 pp. [Downloaded from the World Wide Web on Oct. 27, 2001].

Wu et al., "Entropy-Constrained Scalar Quantization and Minimum Entropy with Error Bound by Discrete Wavelet Transforms in Image Compression," *IEEE Transactions on Image Processing*, vol. 48, No. 4, pp. 1133-1143 (Apr. 2000).

Wu et al., "Joint estimation of forward and backward motion vectors for interpolative prediction of video," *IEEE Transactions on Image Processing*, vol. 3, No. 5, pp. 684-687 (Sep. 1994).

Wu et al., "Quantizer Monotonicities and Globally Optimally Scalar Quantizer Design," *IEEE Transactions on Information Theory*, vol. 39, No. 3, pp. 1049-1053 (May 1993).

Wu et al., "SMART: An Efficient, Scalable and Robust Streaming Video System," *EURASIP on Applied Signal Processing*, vol. 2, 39 pp. (Feb. 2004).

Yang et al., "Rate Control for Videophone Using Local Perceptual Cues," *IEEE Transactions on Circuits and Systems for Video Tech.*, vol. 15, No. 4, pp. 496-507 (Apr. 2005).

Zwicker et al., *Das Ohr als Nachrichtenempfanger*, Title Page, Table of Contents, "I: Schallschwingungen," Index, Hirzel-Verlag, Stuttgart, pp. iii, ix-xi, 1-26 and 231-232 (1967).

Zwicker, *Psychoakustik*, Title Page, Table of Contents, "Teil I: Einfuhrung," Index, Springer-Verlag, Berlin Heidelberg, New York, pp. ii, ix-xi, 1-30 and 157-162 (1982).

* cited by examiner

STREAM SELECTION FOR ENHANCED MEDIA STREAMING

CROSS-REFERENCE TO RELATED APPLICATIONS

This application claims the benefit of U.S. Provisional Patent Application No. 61/057,759, filed on May 30, 2008, and U.S. Provisional Patent Application No. 61/057,755, filed May 30, 2008. Both applications are hereby incorporated in their entirety.

BACKGROUND

With the increasing popularity of playing streaming audio and video over networks such as the Internet, there is a need for optimizing the data transferred from a server to a client such that the client's experience is maximized even if network conditions during playback are inconsistent. Optimizing the client's experience involves making encoding decisions such that the video can be transferred and reconstructed with a minimal number of errors.

The term "streaming" is typically used to indicate that the data representing the media is provided by a host computer over a network to a playback device (i.e., a media playback computer implemented as any of a variety of conventional computing devices, such as a desktop PC, a notebook or portable computer a cellular telephone or other wireless communication device, a personal digital assistant (PDA), a gaming console, etc.) The client computer typically renders the streaming content as it is received from the host, rather than waiting for the entire file to be delivered.

The quality level is generally dictated by the bit rate specified for the encoded audio or video portions of the input stream. A higher bit rate generally indicates that a larger amount of information about the original audio or video is encoded and retained, and therefore a more accurate reproduction of the original input audio or video can be presented during video playback. Conversely, a lower bit rate indicates that less information about the original input audio or video is encoded and retained, and thus a less accurate reproduction of the original audio or video will be presented during video playback.

Generally, the bit rate is specified for encoding each of the audio and video based on several factors. The first factor is the network condition between the server and the client. A network connection that can transfer a high amount of data indicates that a higher bit rate can be specified for the input video that is subsequently transferred over the network connection. The second factor is the desired start-up latency. Start-up latency is the delay that a video playback tool experiences when first starting up due to the large amount of data that has to be received, processed, and buffered. Start-up latency can also occur after a seek operation, where the user selects variable positions in the streaming content to view. A third factor is the processing capabilities of the playback device. The fourth factor is the tolerance to glitching. Glitching occurs when the content is not displayed at the rate it was authored causing the playback device to run out of data to display. In most cases any amount of start-up latency or glitching is intolerable, and it is therefore desirable to optimize the bit rate specified such that the start-up latency and the glitching are minimized or eliminated.

SUMMARY

The present disclosure relates to playback of video/audio streaming media data to provide a glitch-free experience. The system adapts the media stream to the user connection in order to choose the most desirable stream to avoid glitches. For example, in the case where there is interference (e.g., a microwave being used near a wireless device), the quality of the media stream is lowered in order to avoid glitches. Playback criteria, such as a buffer level or a quality measurement of a segment, can by dynamically analyzed in order to determine a next media stream to download.

Stream selection can be made using a heuristics module located on the playback device that analyzes various aspects of the playback to make intelligent decisions about which media stream to download from a network.

The foregoing and other objects, features, and advantages of the invention will become more apparent from the following detailed description, which proceeds with reference to the accompanying figures.

DETAILED DESCRIPTION

As used in this application and in the claims, the singular forms "a," "an" and "the" include the plural forms unless the context clearly dictates otherwise. Additionally, the term "includes" means "comprises." Although the operations of some of the disclosed methods and apparatus are described in a particular, sequential order for convenient presentation, it should be understood that this manner of description encompasses rearrangement, unless a particular ordering is required by specific language set forth below. For example, operations described sequentially can in some cases be rearranged or performed concurrently.

Any of the methods described herein can be performed (at least in part) using software comprising computer-executable instructions stored on one or more computer-readable media. Furthermore, any intermediate or final results of the disclosed methods can be stored on one or more computer-readable media. It should be understood that the disclosed technology is not limited to any specific computer language, program, or computer. For instance, a wide variety of commercially available computer languages, programs, and computers can be used.

Figure 1:
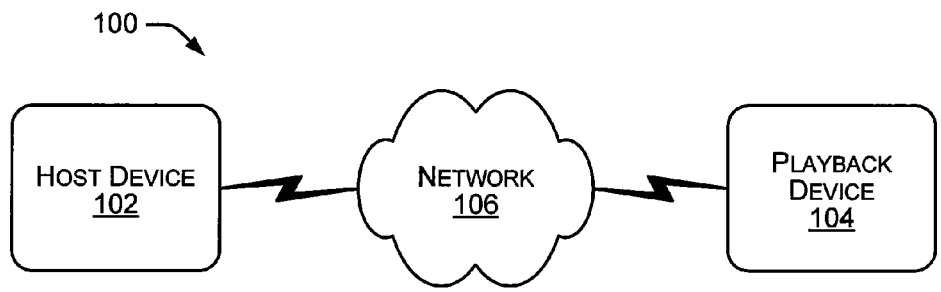
FIG. 1 illustrates an exemplary environment suitable for sending streaming media content over a network from a host device to a playback device.

FIG. 1 illustrates an exemplary environment 100 which can be suitable for transmitting media content being streamed over a network 106 from a host computer device 102 to a playback computer device 104. The network 106 can be any of a variety of conventional network topologies and types (including optical, wired and/or wireless networks), using a variety of conventional network protocols (including public and/or proprietary protocols). The network 106 can include, for example, a home network, a corporate network, or the Internet, as well as possibly at least portions of one or more local area networks (LANs) and/or wide area networks (WANs) or telephone networks.

A host device 102 generally stores media content and streams media content to the playback device 104. The playback device 104 can receive streaming media content via the network 106 from host device 102 and plays it for a user. Additionally, the playback device 102 can request a desired bit rate from the host device, which offers multiple bit rates to download. Host device 102 may be implemented as any of a variety of conventional computing devices, including, for example, a desktop PC, a notebook or portable computer, a workstation, an Internet appliance, and combinations thereof. Playback device 104 may also be implemented as any of a variety of conventional computing devices, including, for example, a desktop PC, a notebook or portable computer, a workstation, an Internet appliance, a gaming console, a handheld PC, a cellular telephone or other wireless communications device, a personal digital assistant (PDA), a set-top box, and combinations thereof.

Host device 102 can make any of a variety of data available for streaming to playback device 104, including content, such as audio, video, text, images, animation, and the like. However, as used herein with respect to the exemplary embodiments described below, media content is intended to represent audio/video (A/V) content or just video content. Furthermore, references made herein to "media content", "streaming media", "streaming video", "video content", and any variation thereof are generally intended to include audio/video content. The term "streaming" is used to indicate that the data representing the media content is provided over a network 106 to a playback device 104 and that playback of the content can begin prior to the content being delivered in its entirety.

Figure 2:
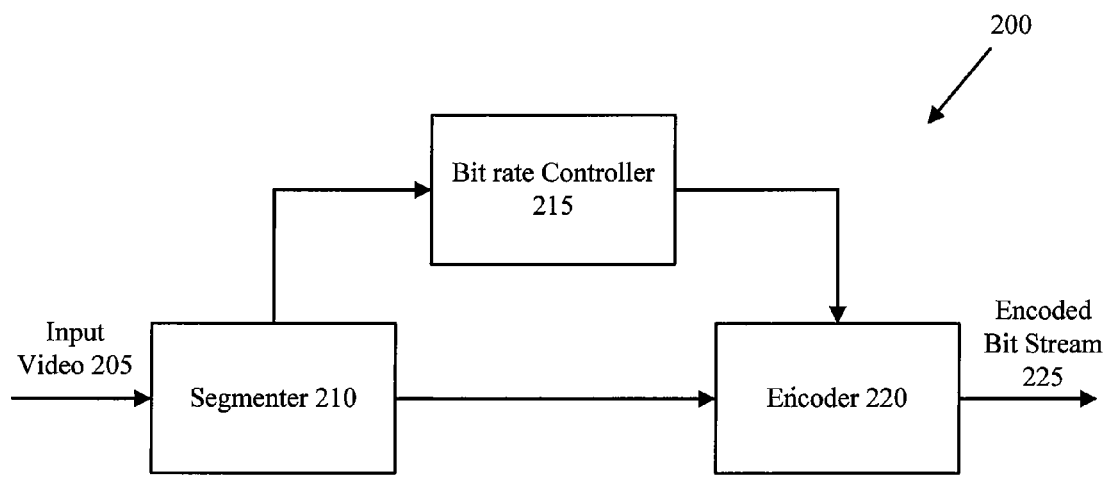
FIG. 2 illustrates an example encoder on the host device.

FIG. 2 illustrates an exemplary encoding tool (200) that can be implemented on the host device 102. The tool includes a segmenter (210) that accepts input video (205) and splits the input video into a plurality of segments each comprising a certain number of frames. Input video generally refers to a stream comprising both audio components and video components. In certain embodiments, the segments each comprise 60 frames. In other embodiments the segments can vary across a range of values such as comprising between 30 frames to 90 frames. The number of frames in the segment can be based on factors such as scene changes in the input video (205). For example, if a segment contains a scene change, the frames before the scene change could be drastically different than the frames after the scene change.

The segmenter (210) outputs the segments to a bit rate controller (215). The bit rate controller (215) analyzes each segment and selects bit rates for one or more bit rate layers for each of the segments. A bit rate layer is a layer comprising a specific bit rate used to encode the input video (205). The number of bit rate layers and their respective bit rates for each segment may be affected by factors associated with the segment such as the number of frames in the segment or the complexity of the input video (205) in the given segment. Additionally, the number of bit rate layers and their corresponding bit rates may be affected by factors not associated with the given segment such as limits on the size of the file or the maximum or minimum bandwidth of the network that the encoded input video (205) will be transferred through. In one embodiment, the bit rate controller (215) selects the bit rates for the bit rate layers for each of the segments independently from each of the other segments. Thus, a given segment may be encoded at the same or different bit rates as any other segment.

The segmenter (210) also outputs the segments to an encoder (220), and the bit rate controller (215) signals the bit rate layers for each segment to the encoder (220). The encoder (220) can encode according to a Windows Media Video or VC-1 format, MPEG-x format (e.g., MPEG-1, MPEG-2, or MPEG-4), H.26x format (e.g., H.261, H.262, H.263, or H.264), or other format. The encoder (220) may also be able to encode according to one or more audio standards such as WAV, FLAC, MP3, WMA, or some other standard. In some embodiments the encoder (220) encodes each segment as each bit rate layer and outputs a series of chunks in an encoded bit stream (225). Generally speaking, a chunk is a segment encoded as a particular bit rate layer. Thus, the encoder (220) can produce one or more chunks for each segment. In other embodiments, the encoder may encode the segment with less than all of the available bit rate layers. This may occur if, for example, a user defines a certain amount of time available for encoding, or conditions make certain bit rate layers un-necessary or undesirable.

As is well-understood in the art, the embodiment of FIG. 2 can be modified to encode a continuous media stream that is not divided into chunks. It is, however, desirable to be able to extract portions of the continuous media stream and to be able to logically define different portions of the media stream for extraction, if desired.

In certain embodiments, the encoding tool (200) may include a splitter (not shown) that splits the input video (205) into a separate video component and an audio component. In these embodiments, a separate segmenter, bit rate controller and encoder can be used to encode each of the video component and the audio component. The encoder for the video component can encode according to WMV or VC-1 format, MPEG-x format, H.26x format, or some other format. The encoder for the audio component can encode according to WAV, FLAC, MP3, WMA, or some other standard. Additionally, the segments for the video component and the segments for the audio component may be selected independently of each other. In this embodiment the segments of the video component may, but do not have to, comprise the same frames as the segments of the audio component.

Figure 3:
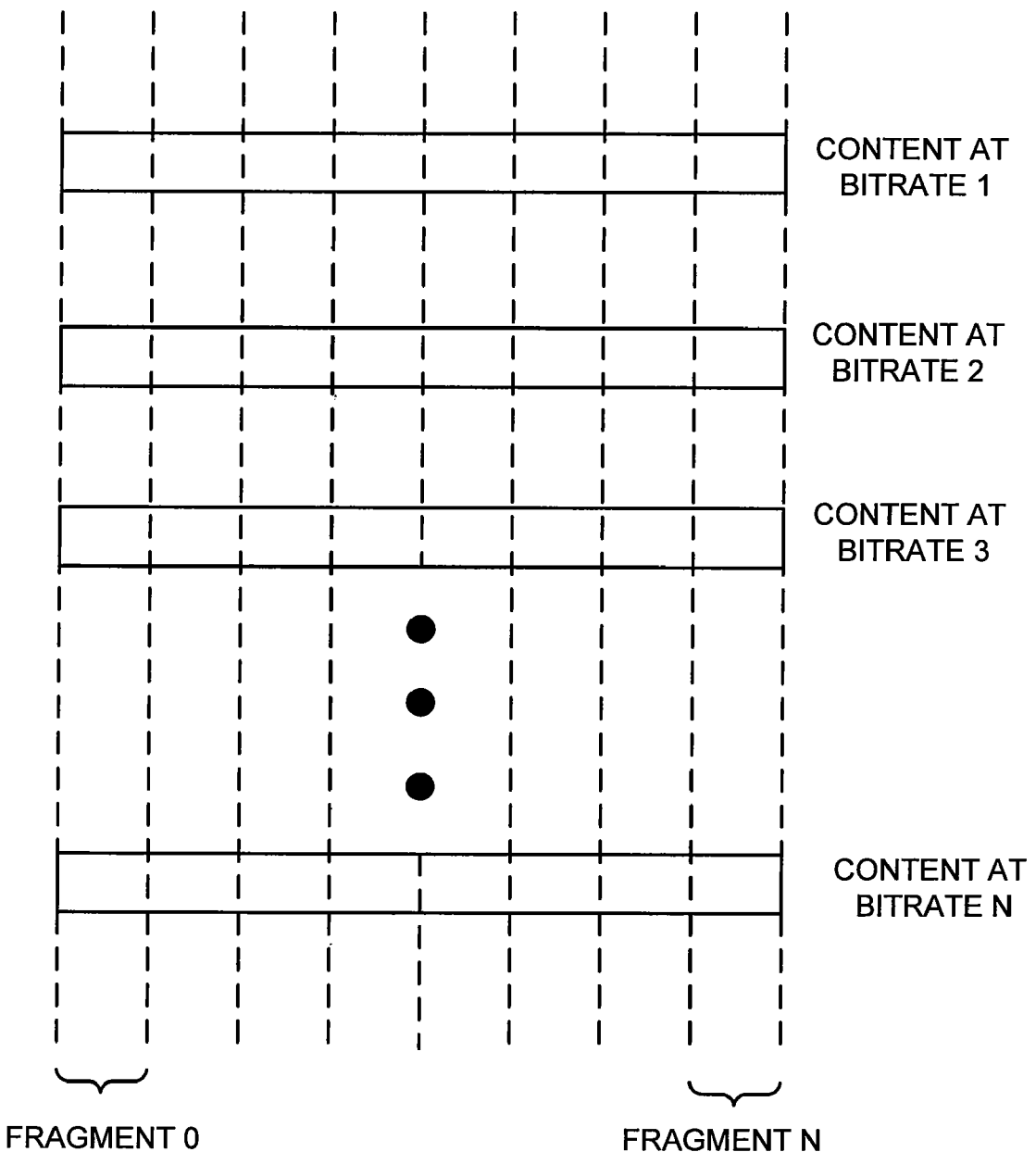
FIG. 3 illustrates example media streams having the same content at different fixed bit rates.

FIG. 3 shows multiple bit rates 1-N for particular content generated by the encoding tool of FIG. 2. The content is identical at each bit rate, but the quality increases with higher bit rates. In the illustrated example, there are N bit rates shown, where N could be any number. In particular embodiments, N is equal to 4. Additionally, the media streams can be divided into segments (also called fragments or chunks). The fragments may range from two to five seconds each in certain embodiments, although any duration may be used. A particular example includes video segments that are 2 seconds in length and audio segments are 5 seconds in length. In the example of FIG. 3, the bit rates are substantially constant amounts (e.g., 1 kbps, 2 kbps, etc.).

Figure 4:
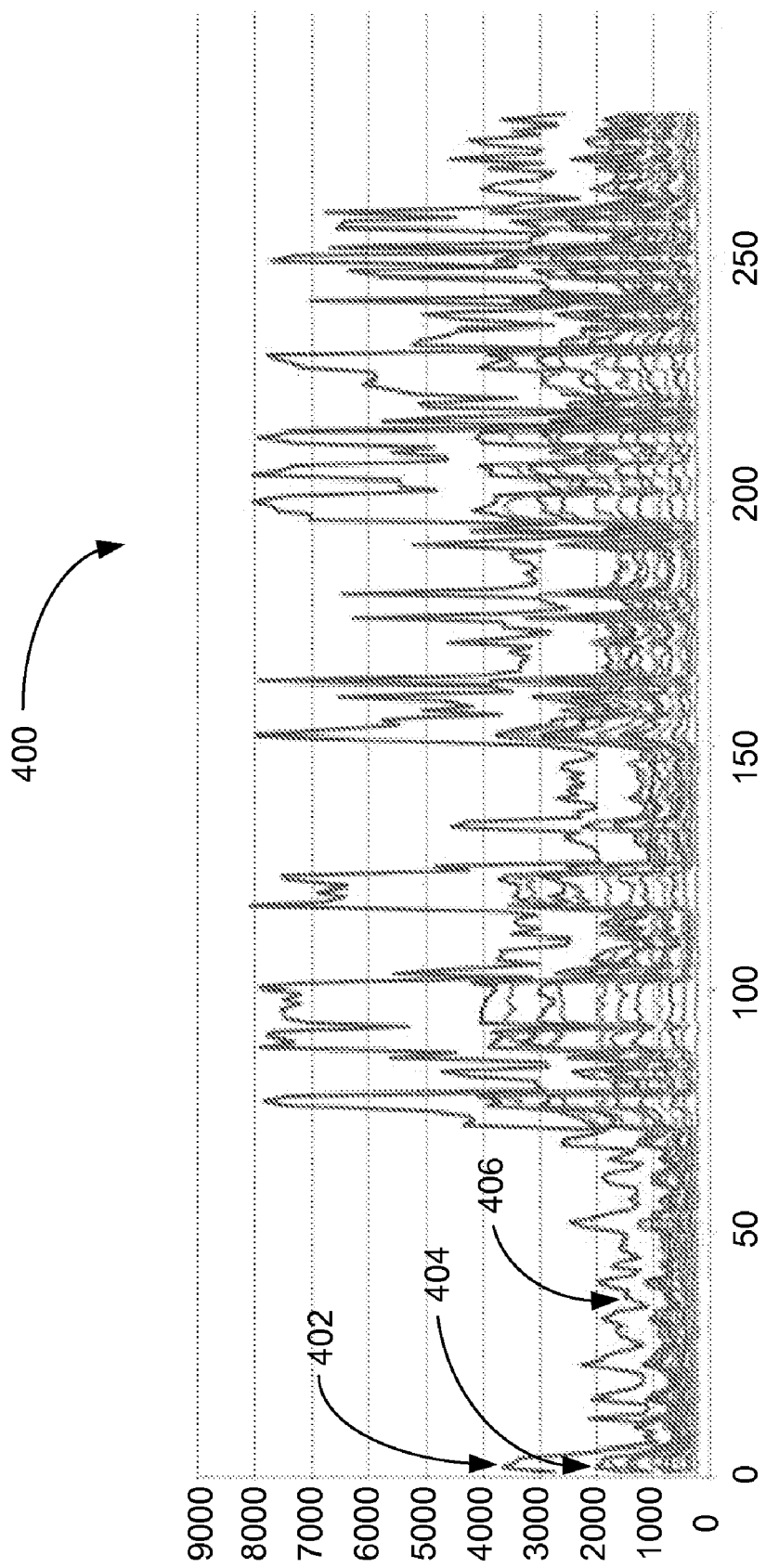
FIG. 4 illustrates an example media streams having the same content at variable bit rates.

FIG. 4 is an example of variable bit rates 400 that may also be used with any of the embodiments described herein and that is generated by the encoding tool. Variable bit rates allocate a different amount of data to a scene based on complexity. Some scenes require a lower bit rate, such as dark scenes with low levels of movement. Other scenes, such as action scenes, require a higher bit rate because the scenes are more complex. A lower complexity scene can be seen between 0 and 50 seconds and has a small bit rate distribution between the media streams. The higher complexity scenes have a high amount of bit rate distribution as seen at about 100 seconds. In a case with such variance in the bit rates, although the bit rate of one media stream may, on average, be the highest, that media stream's bit rate may fall below the maximum bit rate for other media streams. For purposes of illustration, the bit rates are classified as index 1, 2, 3, . . . N. The bit rates for index 1 and 2 are shown at 402, 404, respectively. At a time shown at 406, the bit rate for index 1 is about 1050 bps. However, as can be seen at a time shown at 404, index 2 is about 2000 bps, which is a higher bit rate than index 1 at time 406. Thus, although index 1 is always higher than index 2 at any particular point of time, over the entire time period, index 2 can peak above values of index 1.

Figure 5:
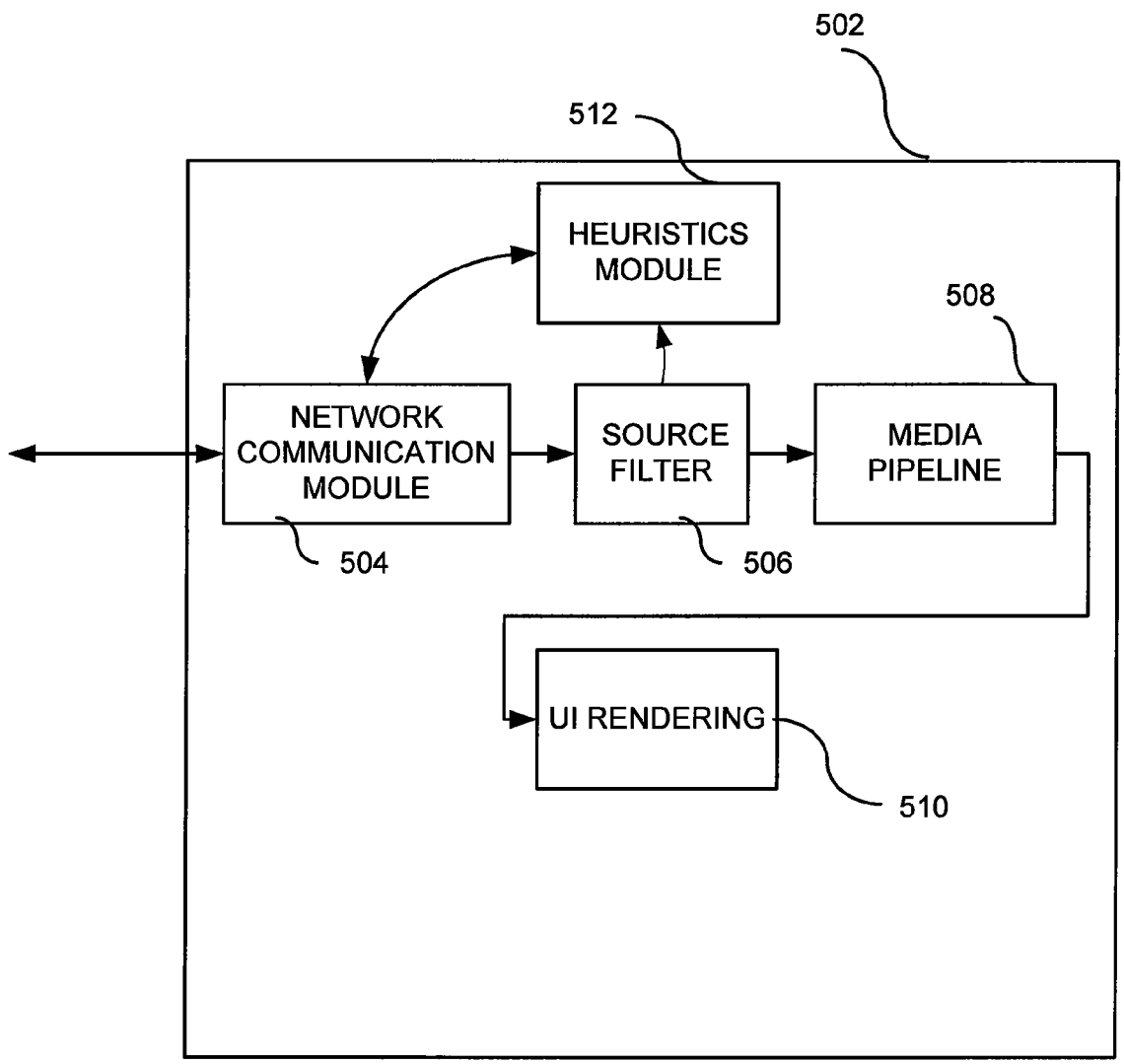
FIG. 5 illustrates an example application for rendering streaming media content on the playback device wherein a heuristics module is in the same application as a media pipeline.
Figure 8:
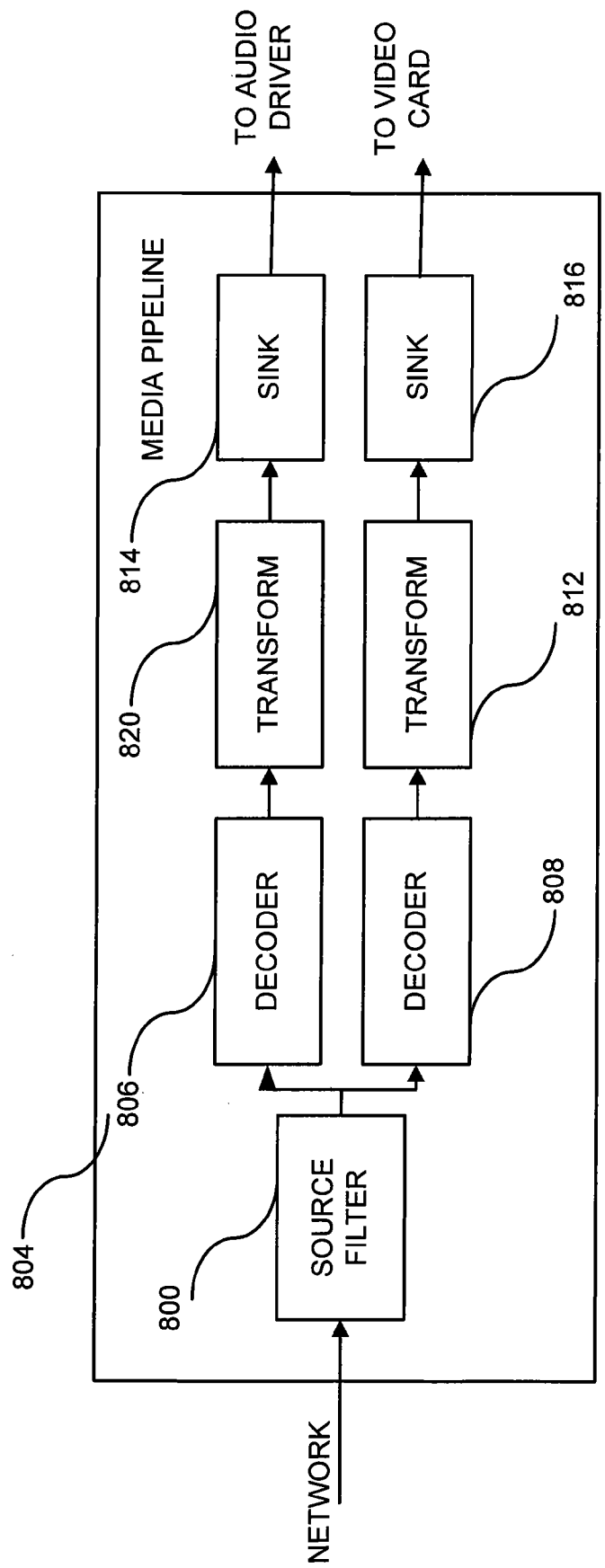
FIG. 8 illustrates an exemplary media pipeline on the playback device.

FIG. 5 illustrates an application 502 loaded on a playback device for rendering content. The application 502 may be run on any desired playback device that renders a media stream, such as a gaming console, a cellular phone, a personal digital assistant, in a browser on a computer, etc. The application can include a network communication module 504, a source filter 506, a media pipeline 508, a UI rendering module 510, and a heuristics module 512. The network communication module 504 generally includes software to communicate with a network server from which the media content is streamed. Thus, it is a downloader to obtain the media stream from the network. One example network communication module includes software for implementing a hypertext transfer protocol when communicating with a Web server. Other well-known protocols can be used depending on the playback device. The network communications module chooses an appropriate bitrate of a media stream as directed by the heuristics module. The source filter 506 can be coupled to the network communication module in order to receive audio and video content from the network. The source filter extracts the core media data (by parsing the file, if necessary) and splits the audio and video into two streams for use by the media pipeline. An example media pipeline 508 is shown in FIG. 8 and is described more fully below. The source filter 506 can be included in the media pipeline or separated there from. In any event, the media pipeline decodes the audio and video streams and provides the decoded streams to the UI rendering module 510 for display. Alternatively, the media pipeline 508 can be coupled to a storage device (not shown) that persistently stores the uncompressed data stream. Any variety of media pipelines may be used. The heuristics module 512 monitors the network (via the network communication module 504) and the source filter to make intelligent decisions about which bit rate to request from the server in order to minimize glitches that are rendered on the playback device.

Figure 6:
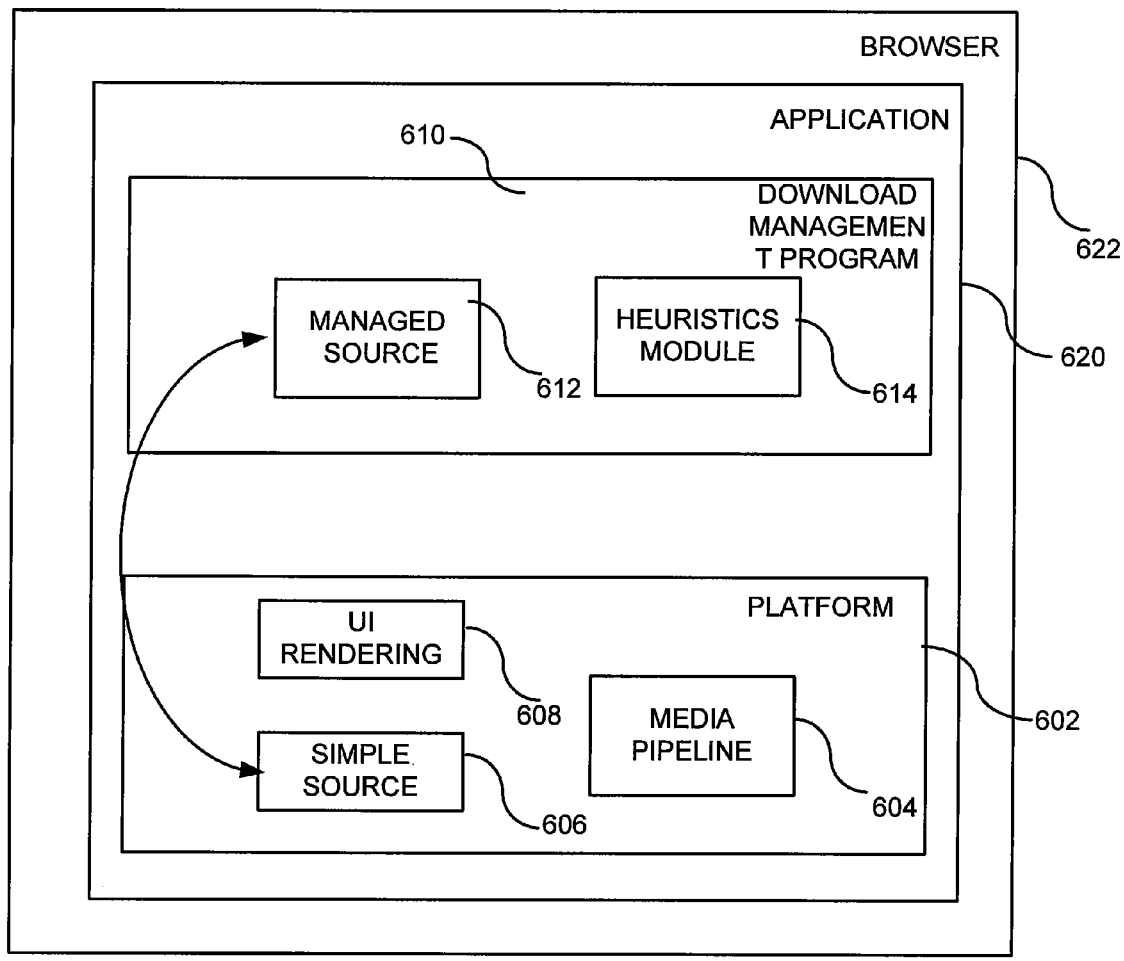
FIG. 6 illustrates an example application for rendering streaming media content on the playback device wherein the media pipeline is in a platform and the heuristics module is in a downloadable (e.g., plug-in) program.

FIG. 6 illustrates another possible environment used to render content on the playback device 104. The lowest layer (not shown) is an operating system executing on the playback device. A platform 602 is an executable file that is downloaded one time from a web server and remains resident on the playback device 104. The platform 602 includes a media pipeline 604 that is explained further below in FIG. 8, a simple source module 606, and a UI rendering module 608 used to render the media stream. A download management program 610 is typically downloaded each time a website is accessed and includes a managed source 612 and a heuristics module 614, which include the intelligence to make decisions about a desired bit rate to download from the host device 102. The purpose of the simple source 606 is to communicate with the managed source 612. Both the managed source 612 and the heuristics module 614 are described further below. The download management program 610 and platform 602 are part of an application 620 that is loaded in a browser 622.

Figure 7:
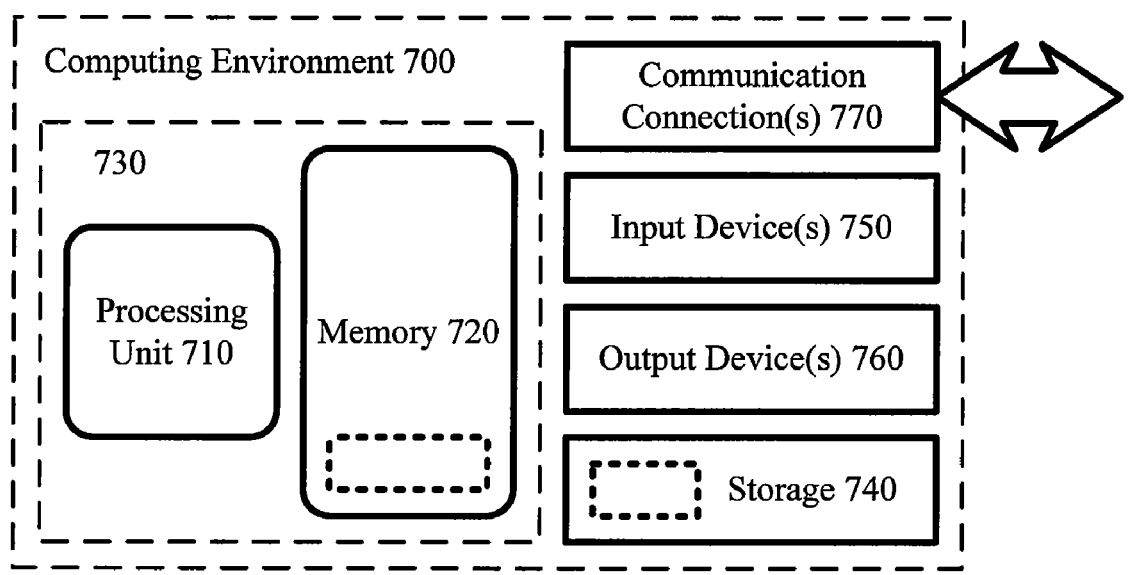
FIG. 7 illustrates an exemplary computing environment.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. Similar computing devices may be used as either the host device 102 or the playback device 104. This most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder and/or decoder.

The input device(s) 750 may be a touch input device such as a keyboard, mouse, pen, or trackball, a voice input device, a scanning device, or another device that provides input to the computing environment 700. The input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "produce" and "encode" to describe computer operations in a computing environment. These terms are high-level abstractions for operations performed by a computer, and should not be confused with acts performed by a human being. The actual computer operations corresponding to these terms vary depending on implementation. Generally, the computing environment 700 can be used as the playback device 104.

FIG. 8 shows an example of the media pipeline 804 in more detail. The illustrated media pipeline is only an example of a possible media pipeline that can be used. In this example, a source filter 800 is included in the media pipeline and is coupled to the network to receive audio and video content from the network. The source filter can extract the core media data (by parsing the file, if necessary) and can split the audio and video into two streams. Two decoders 806, 808 can be used to decompress the encoded audio and video, respectively. Two transform modules 810, 812 can transform the decompressed audio and video signals. The transform operations can include a variety of operations, such as changing color space, changing scale, adding special effects, etc. Finally, sinks 814, 816 can be used to transmit the content to the audio and video drivers, respectively.

Figure 9:
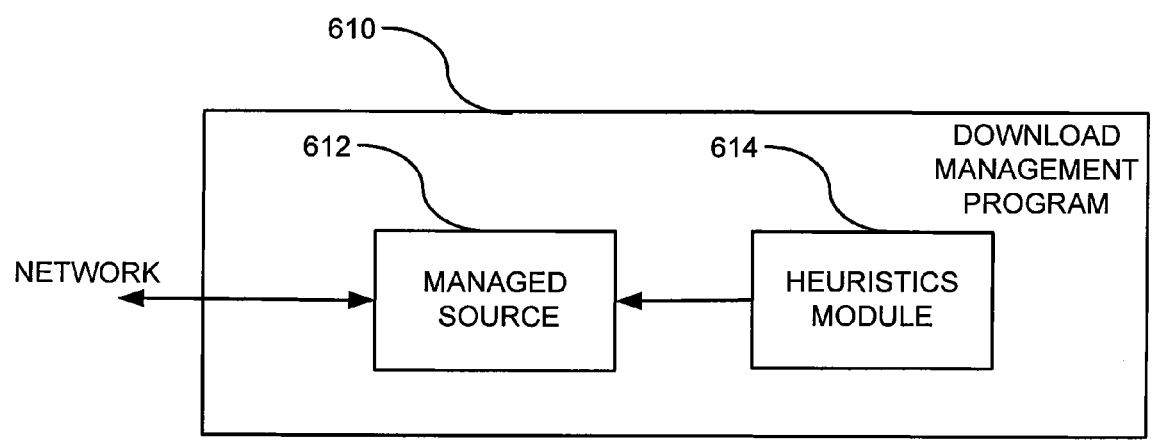
FIG. 9 illustrates a detailed view of a downloadable program coupled to a network.

FIG. 9 shows the download management program 610 in more detail. The managed source 612 reads data from the network (e.g., Internet), parses the data received from the network (e.g., removes header information) and communicates with the heuristics module about which of multiple streams to download from a server on the network. The heuristics module 614 instructs the managed source 612 which bit rate to pull next.

The content can be divided into segments (called chunks) that are generally 2-5 seconds each. The chunks are available at multiple bit rates. After a predetermined period of time, the quality and bit rate are reevaluated to ensure a glitch-free display of the media stream. The content need not be divided into segments. Rather, the media stream can be continuous with an understanding of logical or actual entry points into the media stream.

Figure 10:
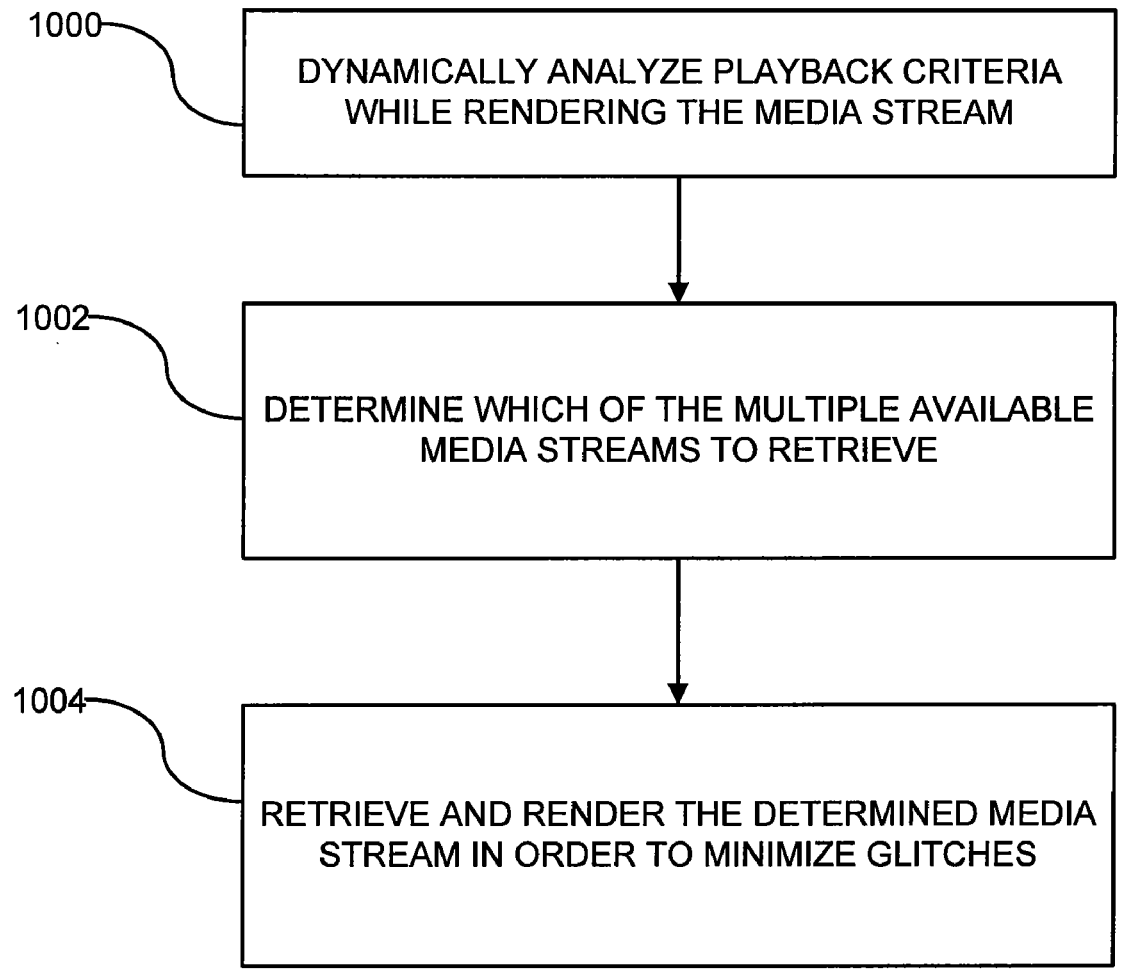
FIG. 10 is a flowchart of a method for rendering content with minimized glitches.

FIG. 10 shows a flowchart of a method for downloading one of multiple media streams. In process block 1000, the playback device 104 can dynamically analyze playback criteria. Thus, the playback device can analyze the playback criteria while the media stream is being rendered. The playback criteria can relate to one or more of the following factors:
  1) fast start-up;
  2) the current and/or historical bandwidth of the network;
  3) the current and/or historical bandwidth of the playback device;
  4) the capabilities of the playback device; and
  5) buffer levels and/or quality of the media stream.

In process block 1002, the playback device 104 can determine, based on an analysis of the playback criteria, which of multiple available media streams to retrieve from a server computer coupled to the playback device. Finally, in process block 1004, the playback device 104 can render the media stream with minimized glitches due to making intelligent choices about which bit rate to download. A playback system is glitch free when the renderer does not run out of data to play. Another reason for a glitch is that the content is not being displayed at the rate it was authored.

Figure 11:
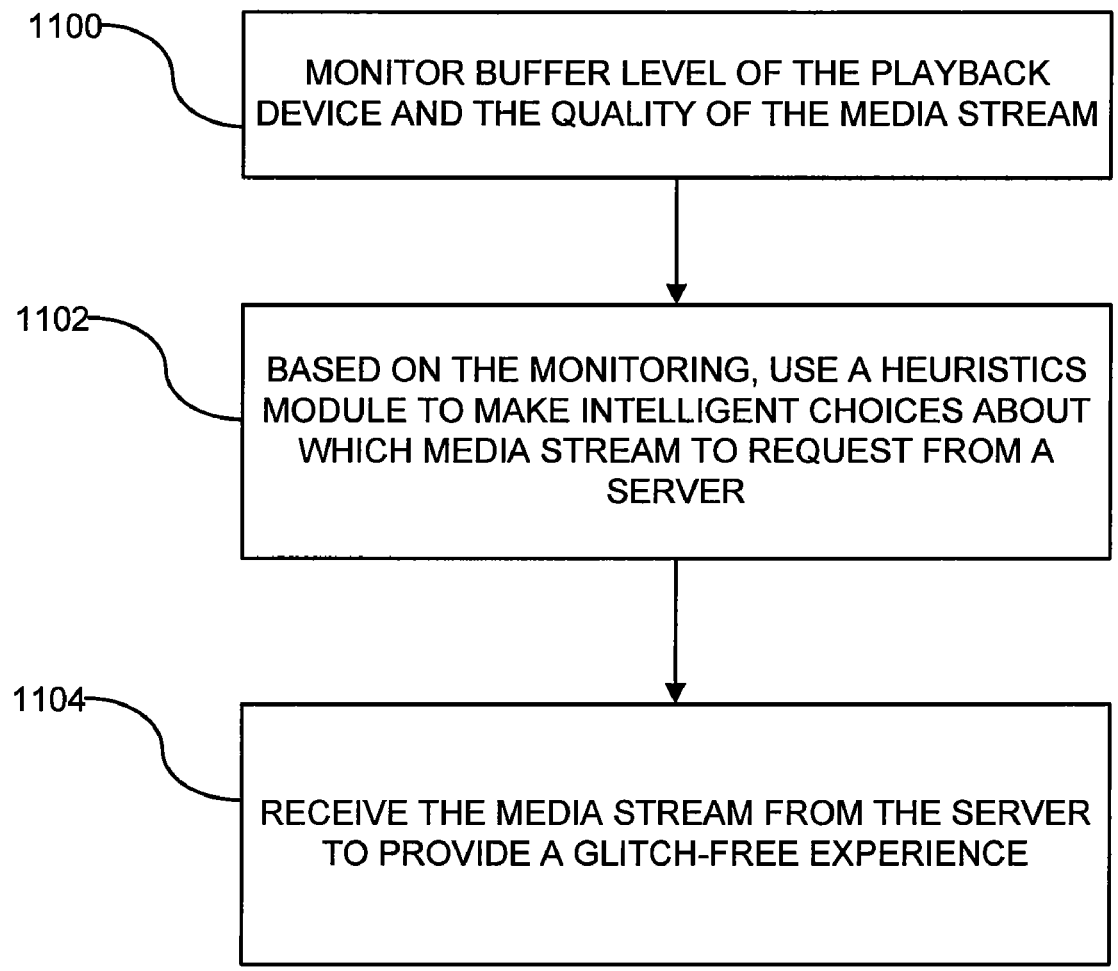
FIG. 11 is a flowchart of a method for using both buffer level and quality in determining which media stream to download from a server.

FIG. 11 is a flowchart of a method for choosing which media stream to download from a server computer using buffer levels and quality of the media stream being displayed. In process block 1100, the buffer level of the playback device and quality are monitored. In process block 1102, based on the monitoring of the buffer level and quality, the heuristics module makes intelligent choices about which media stream to request from the server. In process block 1104, the playback device receives the media stream from the server in order to provide a display with minimized glitches.

Figure 12:
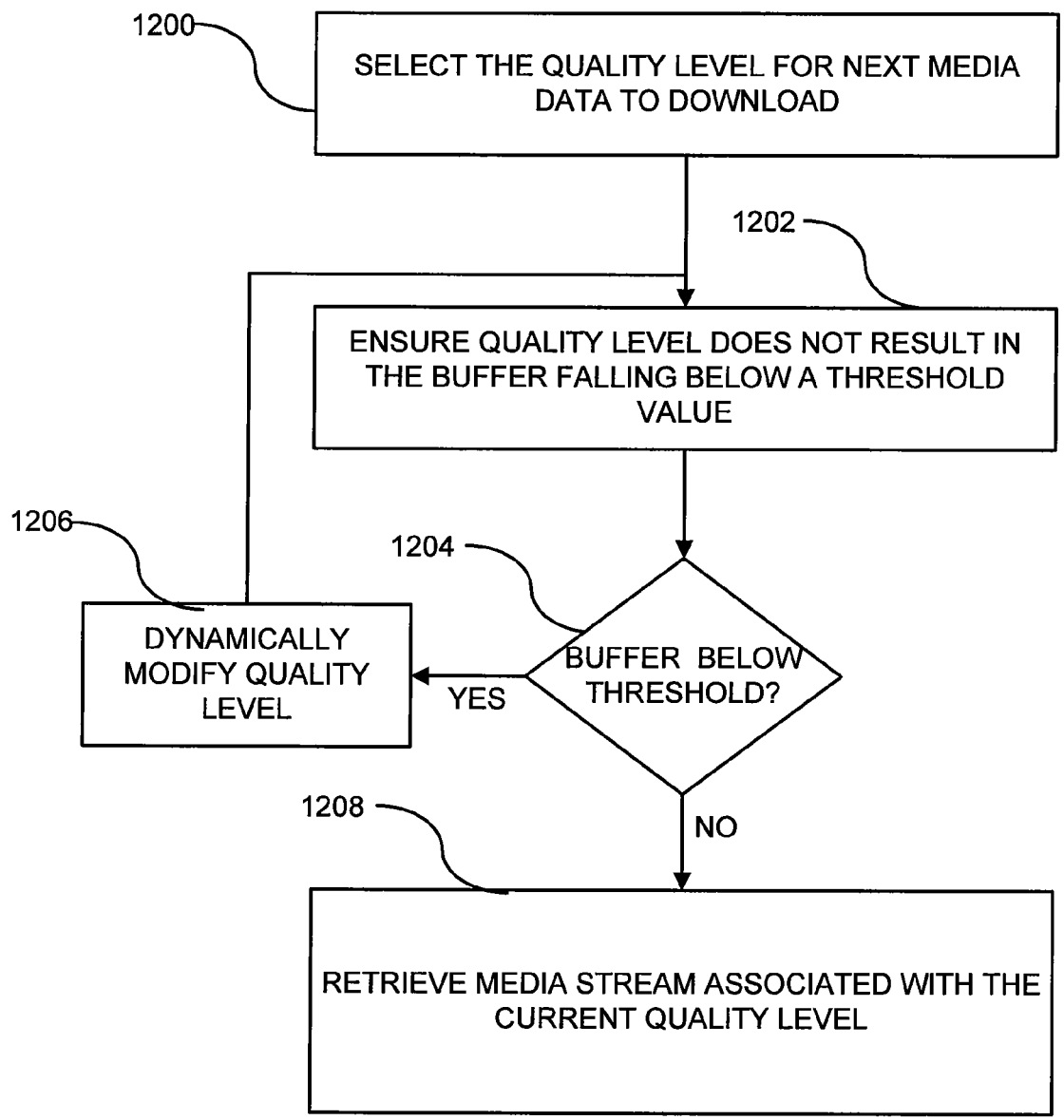
FIG. 12 is a flowchart of a method for dynamically modifying the quality level in determining which media stream to download from a server.

FIG. 12 is a flowchart of a method showing how both quality and buffer levels are used to determine a next chunk of a media stream to download. In process block 1200, the quality level is selected for the next media data (e.g., chunk) to download. In process block 1202, a determination is made whether the quality level could result in the buffer on the playback device to fall below a predetermined threshold (e.g., 5 seconds of playback). If so, decision block 1204 is answered in the affirmative and a new quality level is dynamically chosen (process block 1206). If the buffer levels will be maintained above the predetermined threshold, then in process block 1208, the media stream (e.g., a chunk) is downloaded from the server.

Figure 13:
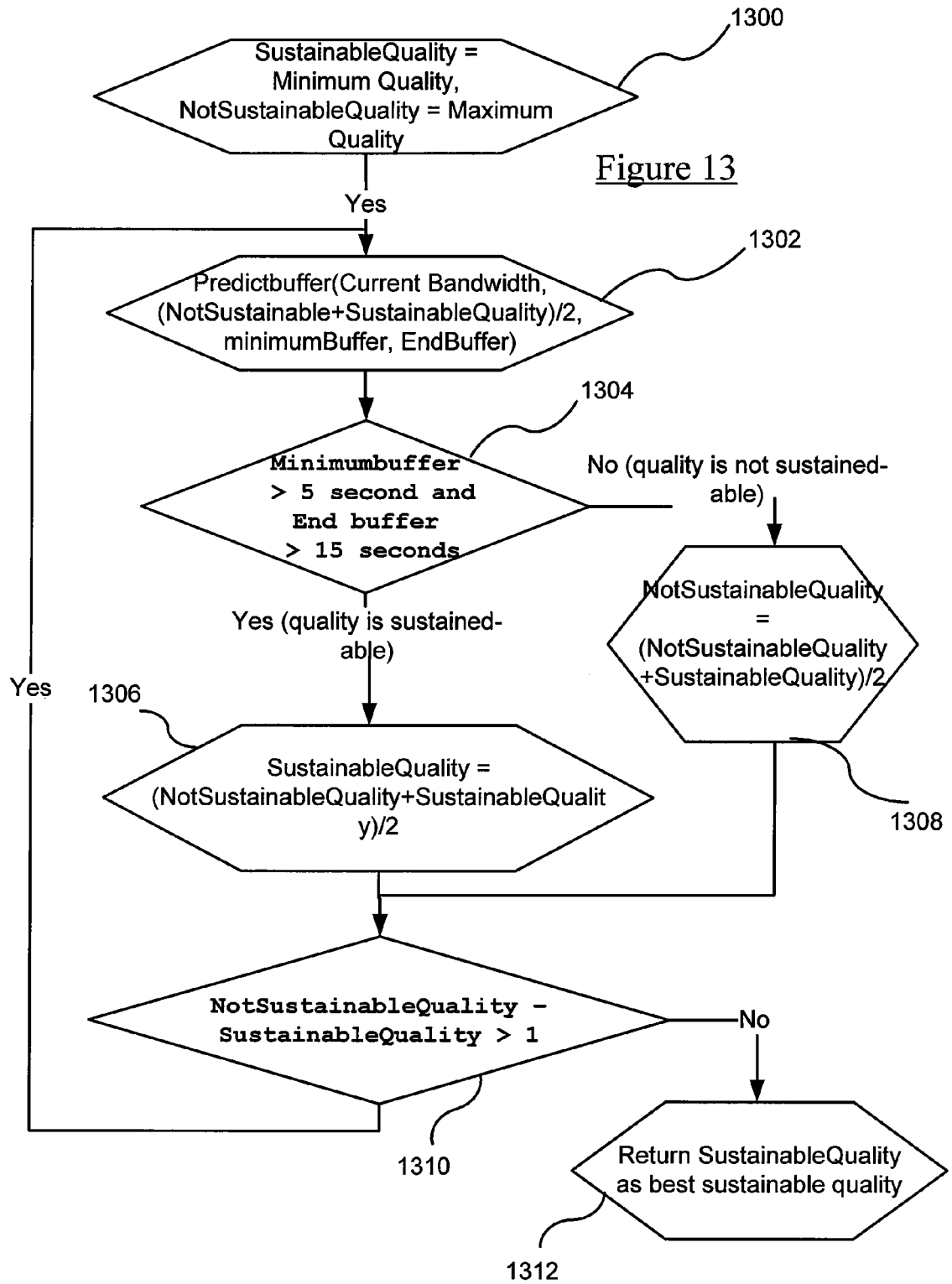
FIG. 13 is a detailed flowchart of a method for dynamically modifying quality.

FIG. 13 provides a detailed example of a particular embodiment that can be used by the heuristic module in order to render content. The algorithm can be designed to select a bitrate stream for the next playback chunk. Some of the goals of the algorithm can include:
  1) Provide a glitch-free experience so that the client playback device does not run out of data in its buffer while streaming.
  2) Use the available network bandwidth to deliver the highest quality audio/video experience.
  3) Provide consistent video quality when the user's bandwidth is stable.

First, it is desirable to obtain the current user bandwidth (e.g., bits per second) and the current buffer level (e.g., by milliseconds). In order to find the best sustainable quality (i.e., the target quality), it is desirable to predict the end buffer size and minimum buffer size for a predetermined number of chunks (e.g., 60 chunks). This predetermined number can be configurable. Assuming each chunk is 2 seconds long, the 60 chunks results in 120 seconds of video playback (of course other time durations and chunk numbers can be used). Predicting the end buffer and minimum buffer size ensures the client has a safe buffer for glitch-free media playback. Looking ahead for a predetermined number of chunks allows the end-user to see consistent video qualities for the next few minutes. Once the target quality is obtained, a selection is made on which media stream to download depending on which media stream has quality that most closely matches the target quality. The source filter can then download the selected chunk for future playback. This procedure is repeated for each chunk which has a different time during playback so that if the bandwidth changes, the source filter can dynamically choose the appropriate chunks for later playback.

The following shows example code illustrating how to select the next video/audio chunk.

```
Function PredictBuffer( __in bandwidth, __in ProposedQuality,
__out minimumbuffer, __out endbuffer )
{
   endbuffer = Current buffer size
   minimumbuffer = endbuffer;
   for( chunkindex = currentindex to next 60 chunks)
   {
      scan all streams for chunkindex, find the chunk with a nearest video quality to ProposedQuality
         endbuffer = Endbuffer + (chunkduration − ( chunksize/bandwidth ))
         if( endbuffer < minimumbuffer )
            minimumbuffer = endbuffer;
   }
}
```

In process block 1300, the variables for sustainable quality and nonsustainable quality are initialized. In process block 1302, a prediction is made for the buffer size. A midpoint between the sustainable and nonsustainable variables is used. In decision block 1304, if the minimum buffer size is more than a first predetermined period of time (e.g., 5 seconds) and the end buffer is greater than a second predetermined period of time (e.g., 15 seconds) then in block 1306, the quality is sustainable and the variable for sustainable quality is calculated as the midpoint between the nonsustainable and the sustainable variables. If decision block 1304 is answered in the negative, then in process block 1308, the quality is not sustainable and the variable for non-sustainability is set as the midpoint between the variables for sustainable and nonsustainable. In decision block 1310, a check is made to determine if the variable for non-sustainability less sustainability is greater than 1. If no, then the sustainable quality variable is used indicating that the two variables are close together. If yes, then the procedure starts over again in process block 1302.

Thus, an iterative process is used to determine the next chunk of data to download that has target quality. The goal is to keep the quality the same for a predetermined number of chunks to keep video quality stable.

Returning briefly to FIG. 4, the quality manager can decide to choose a lower quality bit rate during the period between times 0-50 seconds because the bit rate distribution is low. Thus, when bit rate distribution is low, the highest bit rate requires more time to download, but does not offer much higher quality than streams with a lower bit rate. On the other hand, at time 100 seconds, there is a wide distribution of bit rates and it may be desirable to select the highest bit rate to ensure high quality. This highest bit rate may exceed the available bandwidth of the network, but the quality manager sacrifices by choosing to conserve time by downloading lower bit rates than the available bandwidth during low complexity scenes so that more time can be spent downloading higher complexity scenes. Thus, the quality manager makes intelligent decisions to maintain relatively constant quality by downloading a media stream that is lower than it is capable of downloading during low-complexity scenes to conserve bandwidth for higher complexity scenes. By so doing, the bit rates that exceed the available bandwidth can be used.

Figure 14:
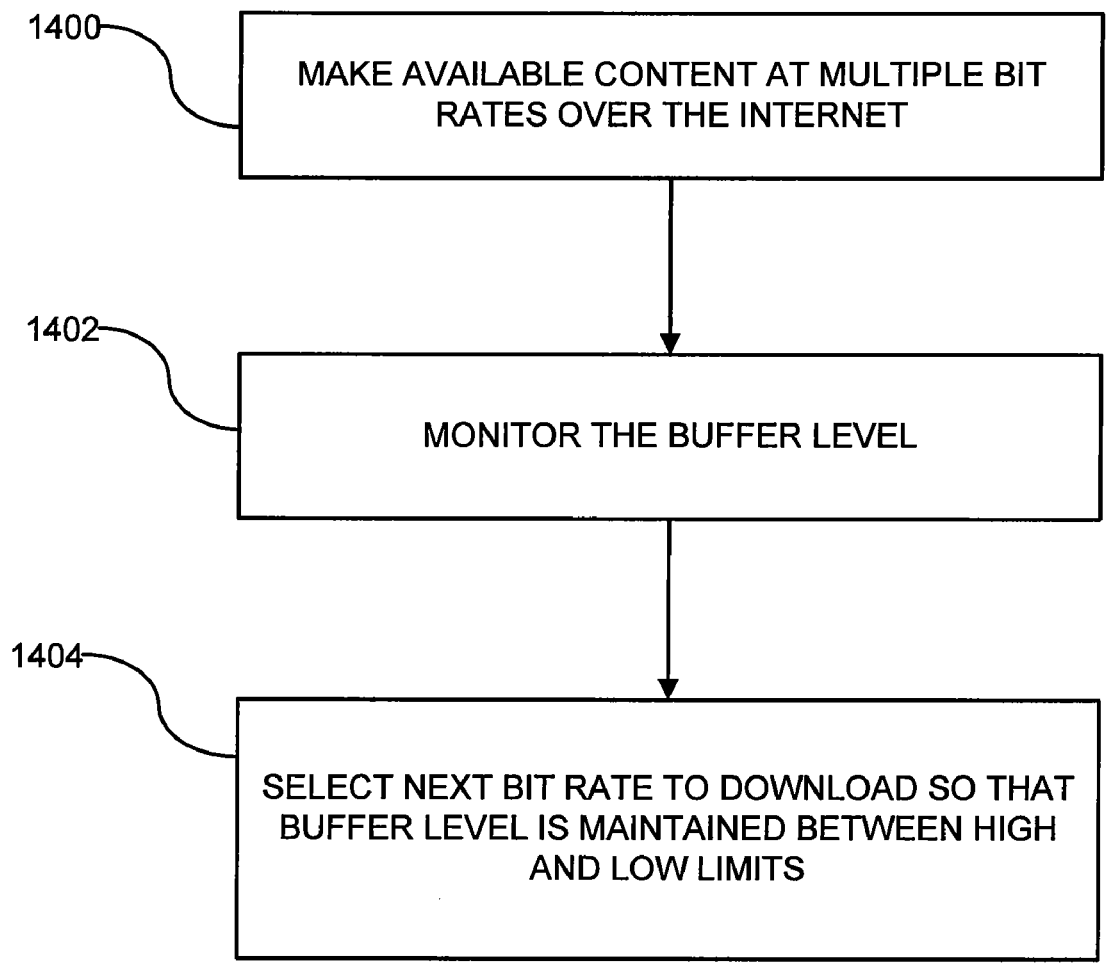
FIG. 14 is a flowchart for determining a media stream to render using buffer levels.

FIG. 14 is a flowchart of a method regarding how the heuristics module chooses a bit rate to download based on buffer levels. In process block 1400, the playback device 104 is capable of pulling content from a server at any one of multiple bit rates over the Internet. In process block 1402, the heuristics module monitors the buffer level that is stored on the playback device (e.g., the buffer can be maintained in the managed source 312). There are variations in the rate at which data is received from the network, due to noise, etc. Thus, it is desirable to ensure that the buffer in maintained at a level so that the renderer does not run out of data and create a glitch. The buffer is maintained in a safety zone having a high and low threshold. If the buffer begins to drop due to network bandwidth, then a lower rate can be selected to return the buffer to the safety zone. If the buffer is full, then the heuristics module can select a higher bit rate to optimize quality. In process block 1404, the heuristics module selects the bit rate so that the buffer level is maintained in the safety zone between high and low limits.

There are multiple options for monitoring buffer levels including monitoring the number of bytes in the buffer and monitoring the amount of time remaining to render. It is desirable at start-up to select a low bit rate in order for the buffer to reach the safety zone. After that, the selected bit rate can be increased to improve quality.

Figure 15:
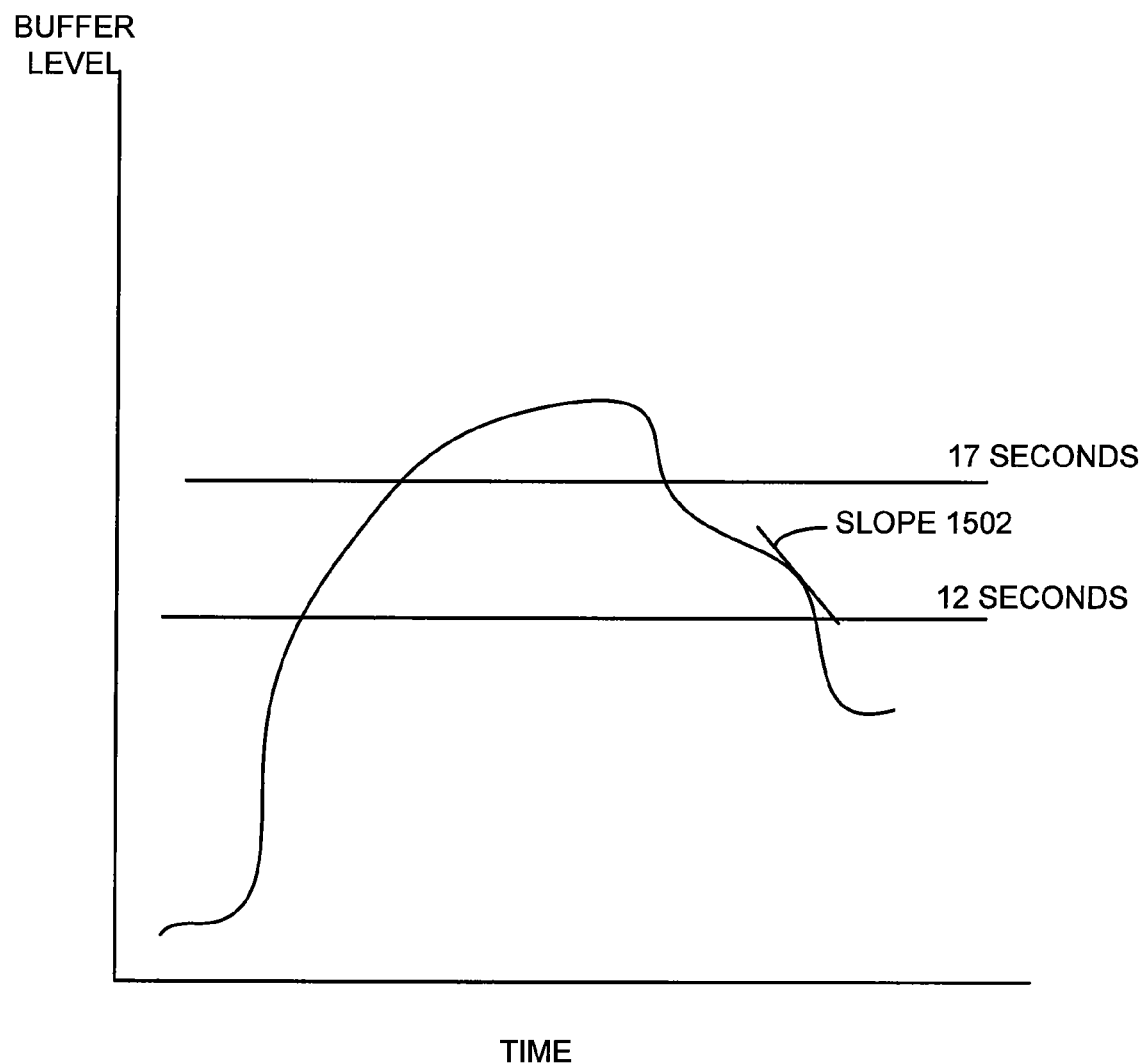
FIG. 15 is an example of a buffer level verses time graph with specific levels shown.

FIG. 15 is a graph showing the buffer levels as a function of time. A slope 1502 is used to determine the rate at which the buffer levels are rising and falling. Based on this slope, a determination can be made on the next bit rate to download. For example, if the slope is decreasing rapidly, it may be desirable to drop the bit rate more quickly. In the specific example of FIG. 15, the high and low limits are shown as a duration of time remaining to render (i.e., 17 and 12 seconds). If the buffer is at the maximum level or above, higher quality chunks can be downloaded for future rendering because the playback device is not struggling to keep up. Conversely, if the buffer is at the lower limit or below, lower quality chunks can be downloaded in order to increase the buffer levels. Keeping the buffer between threshold limits ensures glitches are minimized or eliminated.

To increase the bit rate, the heuristics module can also take into account the historic bit rate that was acceptable in addition to the buffer levels. In order to maintain the historic data, the heuristics module can monitor the time and size of a file that was downloaded in order to determine the actual bandwidth from the client perspective.

Taking quality into consideration is particularly advantageous when variable bit rates are available. Thus, rather than having bit rates that are relatively constant, variable bit rates relate to content that is not encoded at a fixed bit rate. But variable bit rates provide additional challenges in that if the heuristics module selected the second index level of bit rates, it may be different than the second level was at a previous point in time. In such a case, it is possible to allocate lower bandwidth for quality (e.g., low motion) scenes and higher bandwidth for high quality (e.g., high motion) scenes. Thus, the heuristics module can take into account quality and size in making a determination about what stream to choose.

Many past models maintained the bit rate below the bandwidth of the network. However, when taking quality into consideration, low quality scenes can be utilized by lowering the bit rate in order to reach a high buffer level. Then for high quality scenes, a bit rate can be used that is higher than the bandwidth. The high quality scene will take longer to download, but with the buffer at a high level, the playback device has sufficient time to download the high quality segments.

Figure 16:
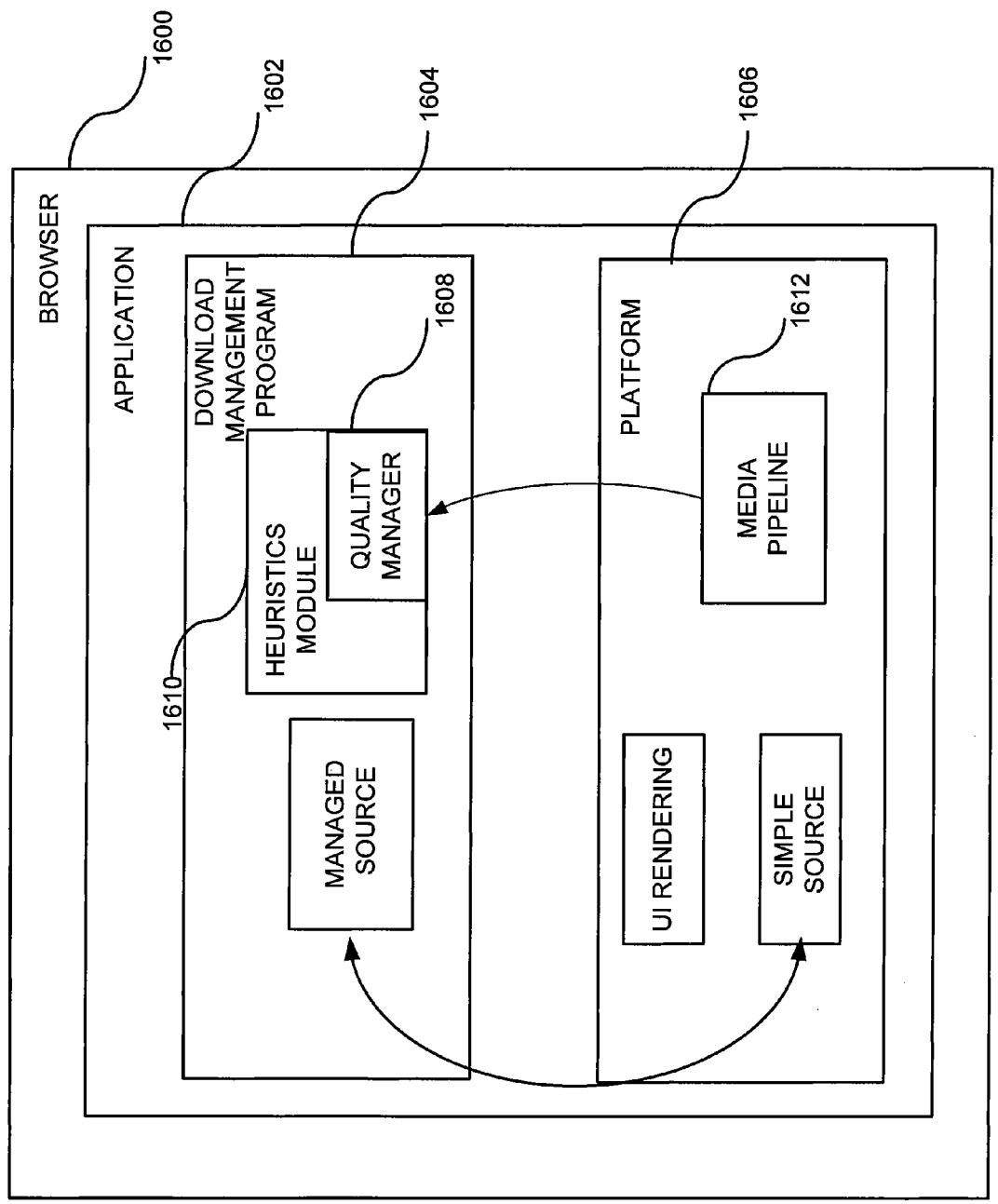
FIG. 16 is an exemplary application for rendering streaming media data using a quality manager.

FIG. 16 shows a browser 1600 on the playback device 104. An application 1602 includes a download management program 1604 and a platform 1606. The application is similar to that previously described, but a quality manager 1608 is part of the heuristics module 1610. The quality manager 1608 monitors the playback device 104 to determine if any frames are being dropped during playback. For example, it is possible that the CPU on the playback device 104 is too slow to decode the frames or process the frames resulting in frames being dropped. The quality manager 1608 monitors the number of frames that the media pipeline 1612 is presenting. If the frame rate drops below a desired threshold (not due to the network), then it assumes there is a blockage somewhere on the playback device 104 and temporarily banes the current bit rate. By switching to a lower bit rate, the CPU processing time is less and frames should not be dropped. After a period of time, the quality manager 1608 can try to switch back to the bit rate that was banned in order to determine if conditions have changed to allow for the higher bit rate.

Figure 17:
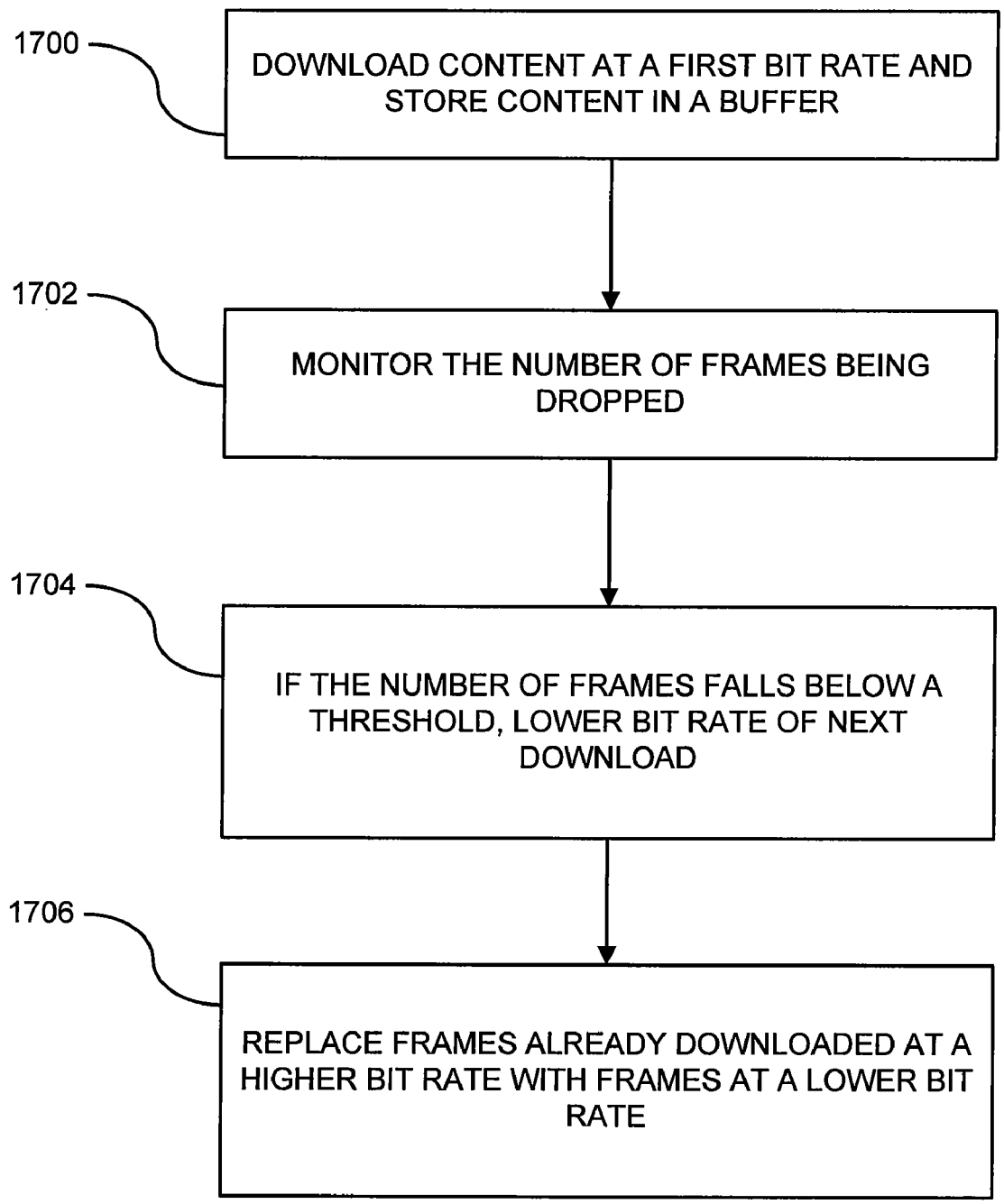
FIG. 17 is a flowchart of a method for using the quality manager to replace frames.

FIG. 17 shows another feature of the quality manager 1608. In process block 1700, content is downloaded at a first bit rate and stored in a buffer on the playback device 104, such as a buffer stored in the managed source. In process block 1702, the quality manager 1608 monitors the number of frames being dropped by the media pipeline 1612. In process block 1704, if the number of frames falls below a desired threshold, the quality manager 1608 selects a more suitable chunk, which might be a lower bit rate, a lower complexity, or another criteria. In process block 1706, frames already downloaded at the higher bit rate are replaced with frames downloaded at the lower bit rate. Thus, if 20 seconds of content is already loaded in the buffer at a high bit rate, it is preferable to not continue to lose frames for the next 20 seconds. Instead, some segments of the same content already downloaded at the high bit rate are re-downloaded at the lower bit rate. As much content as possible is replaced while maintaining the buffer levels in order to continually reduce the number of frames lost. Thus, the quality manager has the ability to lower the bit rate (or resolution) of content in response to detection of bottlenecks in the system.

Figure 18:
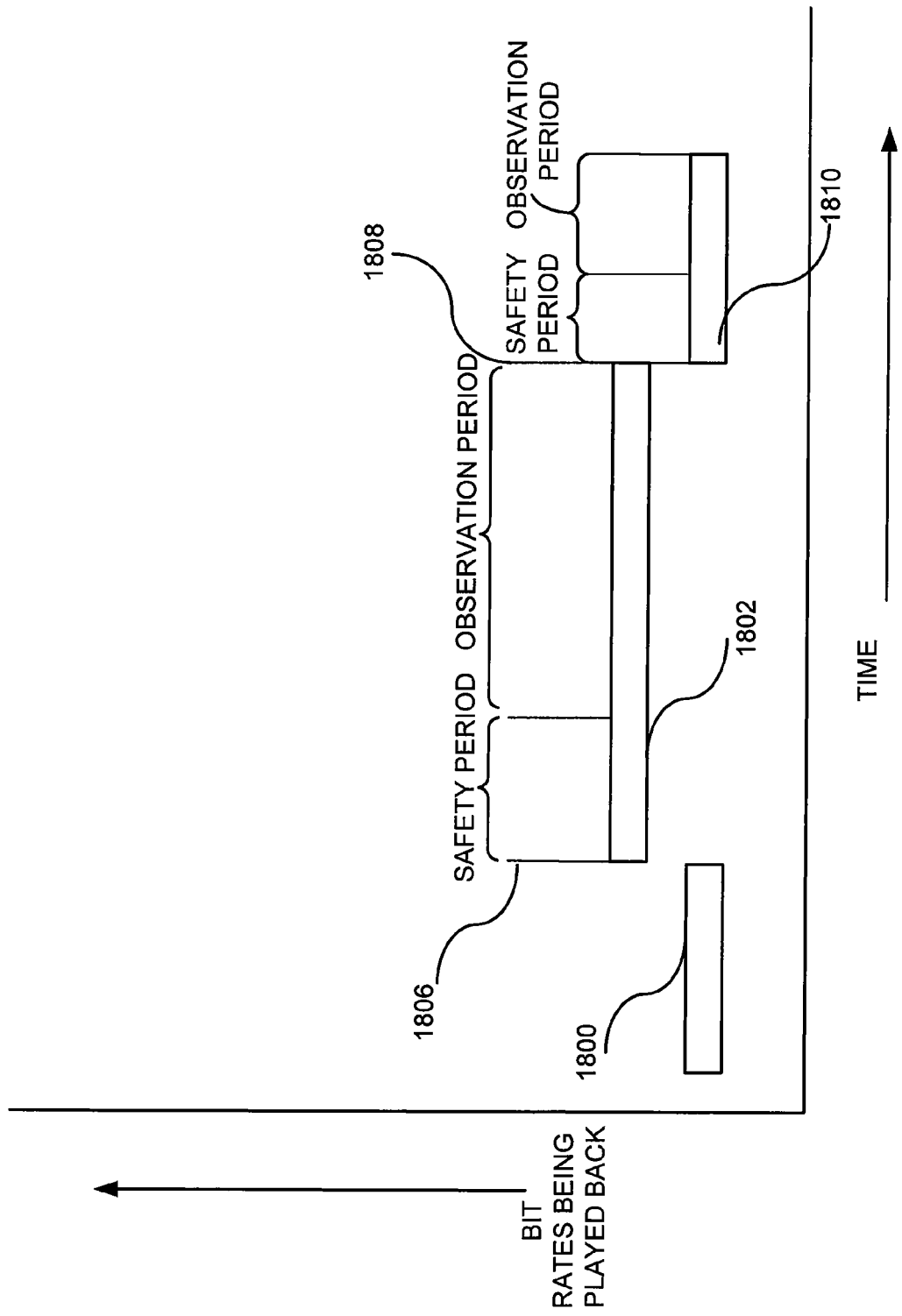
FIG. 18 illustrates safety and observation periods used by the quality manager.

The number of levels that the bit rate drops depends on the number of frames being dropped. FIG. 18 shows a graphical representation wherein the Y-axis is the bit rates being played and the X-axis shows time. For a first period of time, a bit rate shown at 1800 is played and an acceptable number of frames are dropped. Thus, the heuristics module can switch to a higher bit rate shown at 1802. If the playback device 104 cannot handle the higher bit rate, it generally is not instantaneous that frames are dropped. Rather, it takes a period of time. Thus, there is a safety period 1806 whereby the number of frames being dropped is monitored. In an observation period 1808 there are a number of parameters analyzed, such as CPU utilization, frames dropped, etc. It is during the observation period that the quality manager 1608 decides to ban the higher bit rate and switch back to the lower bit rate 1810. Each change in bit rate brings a new safety period and observation period.

Figure 19:
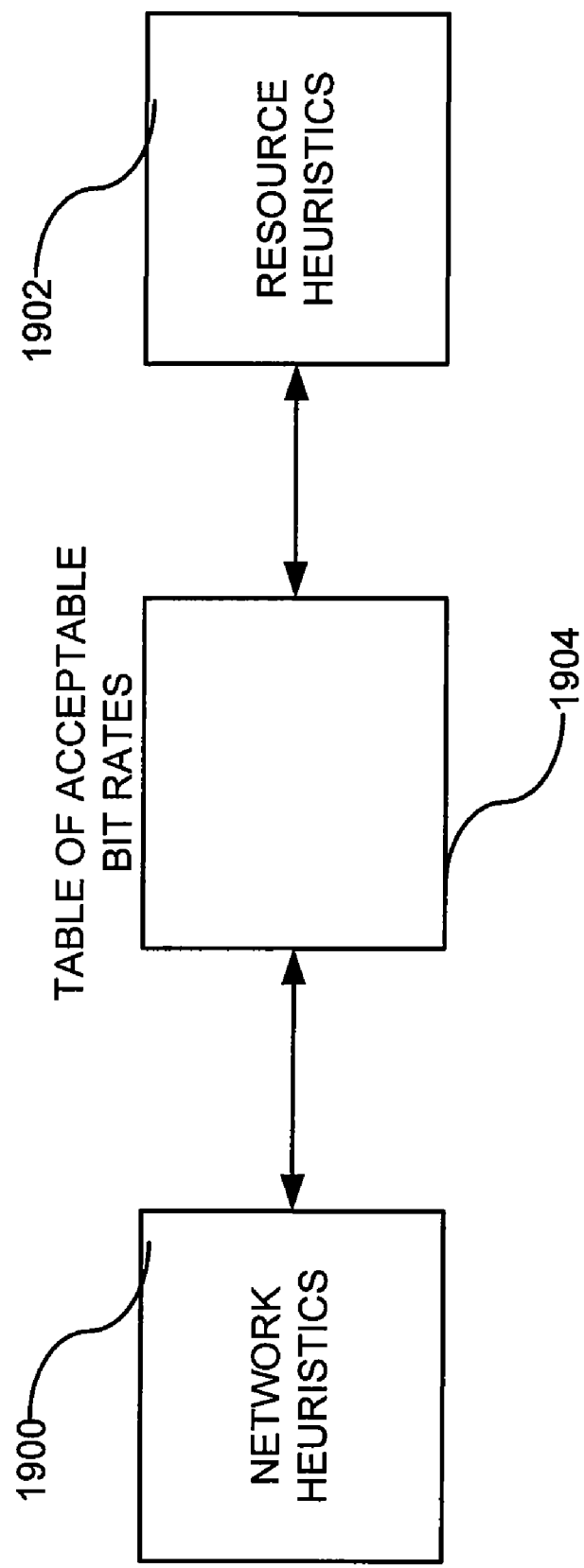
FIGS. 19-20 illustrates network heuristics and resource heuristics that cooperate to decide on a bit rate to download.

FIG. 19 shows how the heuristics module chooses an acceptable bit rate. Both a network heuristics module 1900 and resource heuristics module 1902 operate independently. The network heuristics module 1900 monitors network bandwidth, while the resource heuristics module 1902 monitors the playback device 104. Other parameters might also be used, such as memory usage or CPU utilization. Both the network heuristics module and the resource heuristics module read and write to a table 1904 of acceptable bit rates. Where both modules agree on an acceptable bit rate can be considered an intersection point in the table, which is selected as the ideal bit rate. Thus, the network heuristics and resource heuristics cooperate to determine an ideal bit rate.

Figure 20:
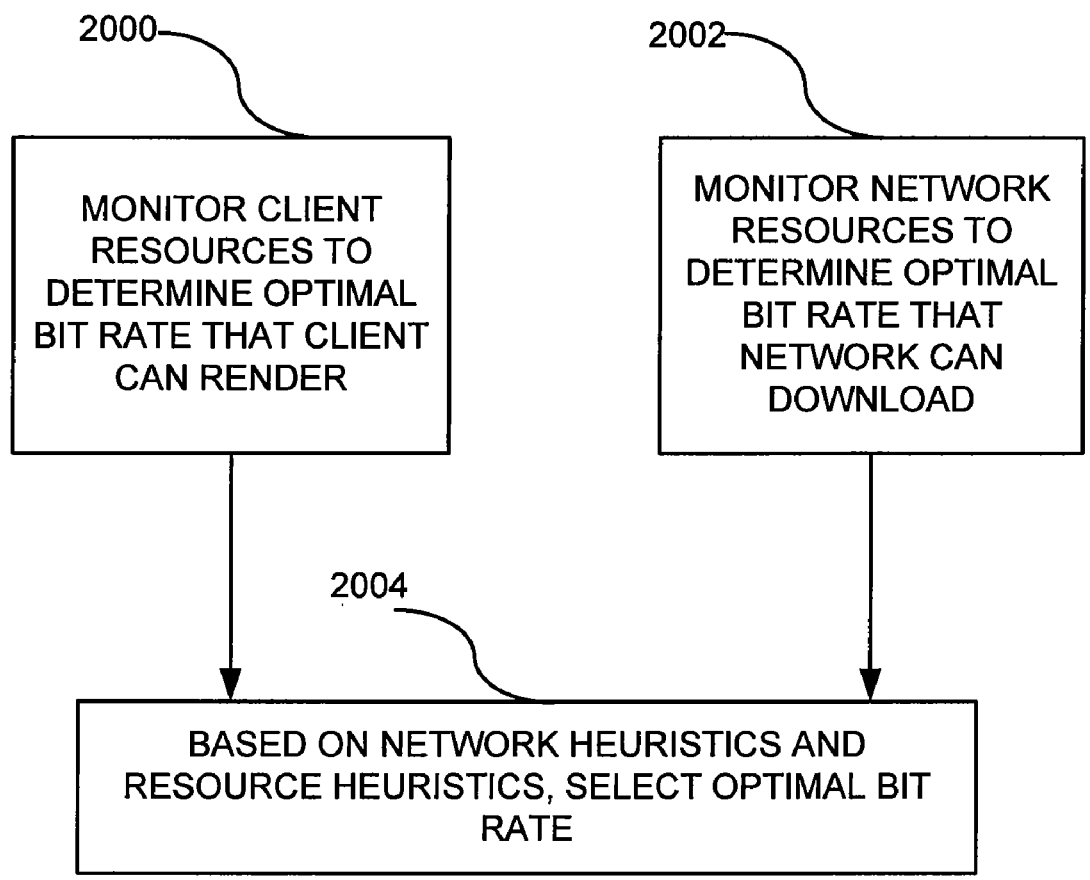

FIG. 20 is a flowchart of a method showing the network heuristics and resource heuristics cooperating together. In process block 2000, the client resources are monitored to determine the optimal bit rate. In process block 2002, the network resources are monitored to determine the optimal bit rate. In process block 2004, based on the client resources as monitored by the resource heuristics and the network resources as monitored by the network heuristics, a determination is made to select the optimal bit rate that is suitable to both.

Thus, the quality manager monitors, in real time, some parameters (such as rendered and/or dropped frames per second) and utilizes those as input to a heuristics module that will automatically disable the video resolutions that cannot be appropriately processed, and select those (smaller resolutions) that would give a better user experience.

It should be noted that the parameters described herein can be user-modifiable and stored in a configuration file. For example, the buffer threshold levels can be set in the configuration file. Such a configuration file can be stored on a server or a client.

Those skilled in the art will recognize that although the media streams are generally described as being downloaded in chunks, the media stream can be instead a continuous stream with actual or logical entry points to be able to extract portions of the stream. As such, the media stream can be divided into virtual fragments. Such a continuous media stream can be used with any embodiments described herein.

Additionally, different characteristics of the media streams can be used for proper rendering. Such characteristics can be provided in a number of ways to the playback device. The characteristics can include one or more of the following: bit rate, quality, resolution, duration, etc.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of rendering a media stream on a playback device, comprising:

dynamically analyzing playback criteria while rendering the media stream using a network heuristics module that monitors network bandwidth and a resource heuristics module that monitors the playback device;

based on the analysis, determining, in the playback device, which of multiple available media streams to retrieve from a network in order to minimize glitches during the playback, the multiple available media streams being the same content encoded at different bit rates, the analysis including agreeing on a encoded bit rate through intersection of acceptable encoded bit rates for both the network heuristics module and the resource heuristics module;

retrieving the determined media stream from the network; and rendering the media stream with minimized glitching.

2. The method of claim 1, wherein the playback criteria includes a buffer level used during playback or a quality measurement of a segment.

3. The method of claim 2, wherein the buffer level relates to a number of bytes in a buffer or an amount of time remaining in the buffer to playback.

4. The method of claim 1, wherein the different bit rates are constant bit rates or variable bit rates.

5. The method of claim 1, wherein the playback device includes one of the following: a computer, a mobile phone, a gaming console, and a television; and wherein the network is the Internet.

6. The method of claim 1, wherein the media stream is divided into fragments of a specified time duration.

7. The method of claim 1, wherein the dynamic analysis occurs in a download management program that is a plug-in to a browser and that is dynamically loaded each time a website is accessed.

8. The method of claim 1, wherein the playback criteria includes analyzing empirical data obtained during the playback.

9. The method of claim 8, wherein the empirical data includes current and historical network bandwidths.

10. The method of claim 8, wherein the empirical data includes a speed with which the playback device displays content.

11. A method of rendering a media stream on a playback device, comprising:

selecting, from the playback device, a bit rate associated with the media stream to download from a network;

storing the media stream in a buffer on the playback device;

monitoring a buffer level of data stored in the buffer; and modifying, in the playback device, the selected bit rate to download based on the buffer level in order to minimize glitches in rendering the media stream, wherein the buffer level has predetermined high and low limits that are used in modifying the selected bit rate, and the selected rate is further determined through monitoring bandwidth of the network.

12. The method of claim 11, wherein the buffer level relates to a number of bytes in a buffer or an amount of time remaining in the buffer to playback.

13. The method of claim 11, further including monitoring the quality level and using the quality level to select the bit rate.

14. A method of rendering a media stream on a playback device, comprising:

selecting, from the playback device, a bit rate associated with a media stream to download from a network, the selected bit rate being one of multiple bitrates associated with a same content;

downloading and storing the content on the playback device;

rendering the media stream on the playback device;

monitoring a rate at which the media stream is being rendered;

modifying the bit rate downloaded from the network based on the monitored rate at which the media stream is being rendered;

for content already downloaded to the playback, replacing the content by re-downloading the content at a different bitrate in order to improve quality on the playback device.

15. The method of claim 14, wherein modifying the bit rate includes lowering the bit rate if the rate at which the media stream is rendered falls below a predetermined threshold.

16. The method of claim 14, wherein monitoring includes using a quality manager to monitor a number of frames that a media pipeline in the playback device is rendering.

17. The method of claim 14, further including selecting a new bit rate by using an intersection point between a bit rate selected by a network heuristics module and a resource heuristics module.

* * * * *